United States Patent
Wang et al.

(10) Patent No.: US 11,767,024 B2
(45) Date of Patent: Sep. 26, 2023

(54) AUGMENTED REALITY METHOD AND APPARATUS FOR DRIVING ASSISTANCE

(71) Applicant: Samsung Electronics Co., Ltd., Suwon-si (KR)

(72) Inventors: Chun Wang, Beijing (CN); Weiming Li, Beijing (CN); Zhihua Liu, Beijing (CN); Jie Dong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 16/957,629

(22) PCT Filed: Oct. 25, 2018

(86) PCT No.: PCT/KR2018/012746
§ 371 (c)(1),
(2) Date: Jun. 24, 2020

(87) PCT Pub. No.: WO2020/085540
PCT Pub. Date: Apr. 30, 2020

(65) Prior Publication Data
US 2020/0324787 A1      Oct. 15, 2020

(51) Int. Cl.
*B60W 50/14*       (2020.01)
*B60K 35/00*       (2006.01)
(Continued)

(52) U.S. Cl.
CPC ............. *B60W 50/14* (2013.01); *B60K 35/00* (2013.01); *B60W 40/06* (2013.01);
(Continued)

(58) Field of Classification Search
CPC ................. B60W 50/14; B60W 40/06; B60W 2050/146; B60W 2552/53;
(Continued)

(56) References Cited

U.S. PATENT DOCUMENTS 6,977,630 B1    12/2005  Donath et al.
10,469,769 B1 * 11/2019 Mukherjee .............. G06F 3/011
(Continued)

FOREIGN PATENT DOCUMENTS

EP    3 232 159 A1    10/2017
EP    3 339 127 A1     6/2018
(Continued)

OTHER PUBLICATIONS

International Search Report and Written Opinion dated Aug. 1, 2019, issued in International Application No. PCT/KR2018/012746.
(Continued)

*Primary Examiner* — Rodney A Butler
(74) *Attorney, Agent, or Firm* — Jefferson IP Law, LLP

(57) ABSTRACT

Embodiments of the present invention provide an Augmented Reality (AR) method and apparatus for driving assistance, which are applied in the technical field of AR. The method comprises the steps of: determining, based on information acquired during the driving process, driving assistance information, and displaying virtual three dimensional (3D) display information corresponding to the driving assistance information. In the present invention, the AR technology can be applied in the vehicle travelling process to assist a driver in better mastering driving information in the vehicle travelling process, and the user experience can be improved.

20 Claims, 16 Drawing Sheets

(51) Int. Cl.
  *B60W 40/06* (2012.01)
  *G06V 20/58* (2022.01)
  *G06V 20/56* (2022.01)

(52) U.S. Cl.
  CPC .......... *G06V 20/582* (2022.01); *G06V 20/588* (2022.01); *B60K 2370/1531* (2019.05); *B60K 2370/177* (2019.05); *B60K 2370/193* (2019.05); *B60K 2370/779* (2019.05); *B60W 2050/146* (2013.01); *B60W 2552/53* (2020.02); *B60W 2555/60* (2020.02)

(58) Field of Classification Search
  CPC ... B60W 2555/60; B60W 40/02; B60K 35/00; B60K 2370/1531; B60K 2370/177; B60K 2370/193; B60K 2370/779; B60K 2370/1868; G06V 20/582; G06V 20/588; G06T 19/006; G01C 21/365
  See application file for complete search history.

(56) References Cited

U.S. PATENT DOCUMENTS

| | | |
|---|---|---|
| 2003/0128182 A1 | 7/2003 | Donath et al. |
| 2013/0293582 A1 | 11/2013 | Ng-Thow-Hing et al. |
| 2015/0175855 A1 | 6/2015 | Nakajima et al. |
| 2015/0245017 A1 | 8/2015 | Di Censo et al. |
| 2015/0268465 A1 | 9/2015 | Nagata |
| 2017/0336627 A1 | 11/2017 | Ieda et al. |
| 2018/0089899 A1 | 3/2018 | Piemonte et al. |
| 2018/0129888 A1 | 5/2018 | Schubert et al. |
| 2019/0051056 A1* | 2/2019 | Chiu ...................... G06N 3/08 |
| 2019/0137294 A1* | 5/2019 | Jung ...................... G06F 16/29 |
| 2019/0138823 A1* | 5/2019 | Doria .................. G06V 20/588 |
| 2019/0303693 A1* | 10/2019 | Watanabe ............... H04W 4/46 |

FOREIGN PATENT DOCUMENTS

| | | |
|---|---|---|
| EP | 3 640 598 A1 | 4/2020 |
| GB | 2548718 A | 9/2017 |
| WO | 2013/169601 A2 | 11/2013 |
| WO | 2015/039654 A2 | 3/2015 |
| WO | 2018/145958 A1 | 8/2018 |

OTHER PUBLICATIONS

European Search Report dated Jan. 14, 2021, issued in European Application No. 18938114.8-1001 / 3720751.

Dannheim et al., "A Novel Approach for the Enhancement of Cooperative ACC by Deriving Real Time Weather Information," XP 055811246, Netherlands, Oct. 6-9, 2013.

Al-Jabi et al., "Toward Mobile AR-Based Interactive Smart Parking System," XP 03350699, Jan. 22, 2019.

European Search Report dated Jun. 14, 2021, issued in European Application No. 18938114.8.

* cited by examiner

The apparatus displays only AR information within the current field of view of the driver, but prepares and renders in advance AR information within a larger range; and, when the driver turns his/her head, the AR information prepared in advance can be displayed quickly to decrease the latency

AUGMENTED REALITY METHOD AND APPARATUS FOR DRIVING ASSISTANCE

CROSS-REFERENCE TO RELATED APPLICATIONS

This application is a U.S. National Stage application under 35 U.S.C. § 371 of an International application number PCT/KR2018/012746, filed on Oct. 25, 2018, the disclosure of which is incorporated by reference herein in its entirety

TECHNICAL FIELD

The present invention, relates to the technical field of Augmented Reality (AR), and in particular: to an AR method and apparatus for driving assistance.

BACKGROUND ART

In the Augmented Reality (AR) technology, virtual objects and/or virtual information can be superposed to a real scene, so that a user can obtain sensual experience beyond the reality. That is, the user can sense a scene in which real objects and virtual objects and/or virtual information coexist.

DISCLOSURE OF INVENTION

Technical Problem

Due to complicated road conditions and some limitations of the driver, it is difficult for the driver to completely master the driving information during the vehicle travelling process, so that it is likely to result in accidents. With the help of AR technology, a driver can master the driving information better during the vehicle travelling process, so that the driver drives the motor vehicle more safely and the occurrence of incidents during the vehicle travelling process is reduced. Therefore, how to apply AR technology in the vehicle driving process of a driver becomes a key, problem.

Solution to Problem

To overcome or at least partially solve the technical problems, the following technical solutions are particularly-provided.

According to one aspect, the embodiments of the present invention provide an Augmented Reality (AR) method for driving assistance, comprising the steps of:

determining, based on information acquired during the driving process, driving assistance information; and displaying virtual three-dimensional (3D), display information corresponding to the driving assistance information.

According to another aspect, the embodiments of the present invention further provide an Augmented Reality (AR) apparatus for driving assistance, comprising:

a determining module configured to determine, based on information acquired during the driving process, driving assistance information; and a displaying, module configured to display, virtual 3D display information corresponding to the driving assistance information determined by the determining module.

Advantageous Effects of Invention

The present invention provides an AR method and apparatus for driving assistance. Compared with the prior art, in the present invention, driving assistance information is determined based on information acquired during the driving process, and virtual 3D display information corresponding to the driving assistance information is displayed. That is, in the present invention, driving assistance information during the driving process is determined by the information acquired during the vehicle travelling process, and virtual 3D display information corresponding to the driving assistance information during the driving process is presented to a driver in a visual and/or auditory manner so as to inform or warn the driver. Accordingly, the AR technology applied in the vehicle travelling process can assist a driver in better mastering driving information during the vehicle travelling process, and the user experience can be thus improved.

Additional aspects and advantages of the present invention will be partially appreciated and become apparent from the descriptions below, or will be well learned from the practices of the present invention.

BRIEF DESCRIPTION OF DRAWINGS

The above and/or additional aspects and advantageous of the present invention will become apparent and be more readily appreciated from the following descriptions of embodiments, with reference to the accompanying drawings, in which.

MODE FOR THE INVENTION

Figure 1:
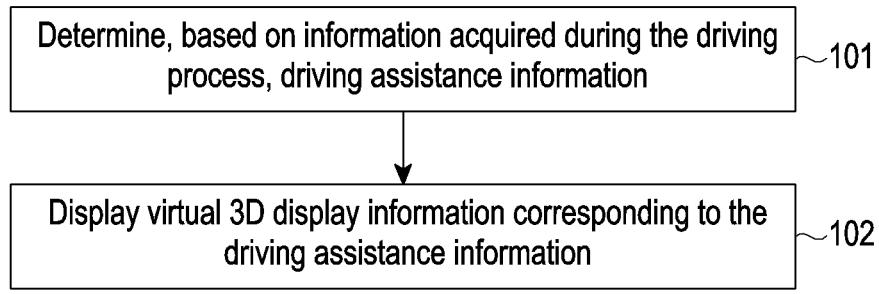
FIG. 1 is a schematic flowchart of an AR method for driving assistance, according to an embodiment of the present invention.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display device or multi-line display device or without a multi-line display device; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be apparatus such as a smart TV and a set-top box.

Advance Driver Assistance Systems (ADASs) are aimed at assisting a driver in safely driving a motor vehicle so as to reduce the occurrence of incidents. The ADASs can return feedback to the driver based on the road condition in a visual, auditory or tactile manner, so as to inform or warn the driver. The ADASs can comprise, but not be limited to, a lane departure warning system, a lane-holding system or more.

The existing ADASs mainly function to provide assistance to a driver under good road conditions, with insufficient solutions in challenging environments such as snowy road surfaces and muddy road surfaces.

The existing ADAS employing the AR technology generally have independent vehicle-mounted screens. However, due to the small screens and the fixed type of displayed information, the driver suffers from unnatural viewing experience. Moreover, due to large latency, it is unable to effectively assist the driver in a challenging driving scene. Therefore, how to adaptively select objects/information to be displayed for the driver, how to present information naturally, how to display information at low latency and how to simultaneously display multiple objects/multiple pieces of information are problems to be solved.

In the embodiments of the present invention, in challenging environments such as snowy road surfaces and muddy road surfaces, by sensing road environment and/or road map information, at least one of the range of a lane, the position of a lane line, the position of a road edge line, road surface traffic signs and non-road surface traffic signs can be estimated, and corresponding AR information (i.e., virtual three-dimensional (3D) display information) can be generated.

With regard to the sensing of the road environment, the apparatus can sense the road environment by at least one of the following modes: sensing by at least one sensor borne on the apparatus; sensing by at least sensor borne on the vehicle; acquiring information from at least one of the following devices in a communication manner: an apparatus of the same type, an apparatus of a different type and other vehicles; and, acquiring information by a Global Positioning System (GPS).

Further, a sensible area of the apparatus can be a union set of ranges sensed by the above modes.

In the embodiments of the present invention, the AR information (i.e., virtual 3D display information) can comprise, but not be limited to, at least one of the following: AR objects, AR words, AR pictures and AR animations. This will not be limited in the embodiments of the present invention.

In the embodiments of the present invention, with regard to the adaptive selection of AR information to be displayed, a certain piece or multiple pieces of AR information to be displayed are determined adaptively by at least one of the following modes: sensing the road environment, sensing the state of this vehicle and sensing the driver's intention, and corresponding contents are generated.

In the embodiments of the present invention, with regard to presenting the AR information in a natural viewing manner, the AR information is displayed at a physically correct position (e.g., a position having a correct relationship with a corresponding real object in terms of relative position, pose, size, occlusion or more) and/or a position to which the driver is accustomed (i.e., a position where the driver does not need to change the driving habits).

In the embodiments of the present invention, a head-mounted display device (e.g., a pair of 3D AR/mixed reality glasses) and/or a vehicle-mounted display device (e.g., a 3D head-up display device) arranged on the vehicle can be cooperatively used. Particularly, by using a head-mounted display device, the apparatus can expand the AR information display space into the whole 3D space.

With regard to the reduction of latency, by the apparatus and method in the embodiments of the present invention, two kinds of latencies (i.e., attention latency and display latency) are adaptively reduced. The attention latency is defined as time delay from the time when the apparatus displays the AR information to the time when the driver notices the AR information; and the display latency is defined as time taken by the apparatus to generate, render and display the AR information.

FIG. 1 is a schematic flowchart of an AR method for driving assistance, according to an embodiment of the present invention.

Step 101: Driving assistance information is determined based on information acquired during the driving process; and step 102: virtual 3D display information corresponding to the driving assistance information is displayed.

Further, the step 101 comprises a step 1011, and the step 102 comprises a step 1021.

In the step 1011, occluded driving assistance information is determined based on information about a sensible area acquired during the driving process; and in the step 1021, virtual 3D display information corresponding to the occluded driving assistance information is displayed.

The occluded driving assistance information comprises at least one of the following: road surface information, non-road surface traffic sign information, and blind area information.

The road surface information comprises at least one of the following: lanes, lane lines, road edge lines, road surface traffic signs, road surface traffic markings.

The non-road surface traffic sign information comprises at least one of the following: roadside traffic signs and traffic signs over the road.

The blind area information comprises: information in a blind area of a rear-view mirror.

The traffic signs comprise at least one of the following: warning signs, prohibitory signs, mandatory signs, guide signs, tourism signs, operating area signs, auxiliary signs and notification signs.

The traffic markings comprise at least one of the following: mandatory markings, prohibitory markings and warning markings.

Further, when the occluded driving assistance information comprises road surface information and/or non-road surface traffic sign information, the step of displaying virtual 3D display information corresponding to the occluded driving assistance information comprises: displaying virtual 3D display information corresponding to the occluded driving assistance information at a position of the occluded driving assistance information.

Further, the step of determining, based on information about a sensible area acquired during the driving process, occluded driving assistance information can be implemented by at least one of the following modes: if the occluded driving assistance information is occluded partially, determining the occluded driving assistance information according to a sensible portion of the driving assistance information; determining, based on the current position of a vehicle and information about a reference in a sensible area during the current driving, the occluded driving assistance information; determining, based on multimedia information of occluded driving assistance information acquired from an angle outside the driver's field of view, the occluded driving assistance information; enhancing and/or restoring the multimedia information based on multimedia information of occluded driving assistance information acquired within a sensible area during the driving process, and determining the occluded driving assistance information; when the occluded driving assistance information comprises road surface information, correcting the position of the occluded driving assistance information according to a map of the current road by aligning the current road with the map; determining, according to other acquired driving assistance information, the occluded driving assistance information.

Further, after the step of determining, based on information about a sensible area acquired during the driving process, occluded driving assistance information, the method further comprises the step of: correcting the determined occluded driving assistance information; and the step of displaying virtual 3D display information corresponding to the occluded driving assistance information comprises: displaying virtual 3D display information corresponding to the corrected driving assistance information at a corrected position.

Further, the step of correcting the determined occluded driving assistance information can be implemented by at least one of the following modes: when the occluded driving assistance information comprises lane-related information, correcting the position of the occluded driving assistance information based on driving trajectory and/or road surface rut information of other vehicles within a preset range from the current vehicle; and, when the occluded driving assistance information comprises road surface information, determining the occluded driving assistance information according to a map of the current road by aligning the current road with the map.

Further, when the occluded driving assistance information comprises lane-related information, the displayed lane width is less than the actual lane width.

The lane-related information comprises at least one of lanes, lane lines, road edge lines, road surface traffic signs, road surface traffic markings.

Further, when the occluded driving assistance information comprises blind area information, the step of displaying virtual 3D display information corresponding to the occluded driving assistance information comprises: displaying, within an extended area of a rear-view mirror, virtual 3D display information corresponding to the blind area information.

When the rear-view mirror is a side-view mirror, the virtual 3D display information displayed within the extended area is generated from a real object corresponding to the virtual 3D display information according to mirror surface attributes of the side-view mirror and the driver's viewpoint.

Further, the step 101 comprises: acquiring traffic regulations and/or traffic policeman's action information for the current road section, and transforming a presentation mode for the determined traffic regulations and/or traffic policeman's action information of the current road section; and the step 102 comprises: displaying virtual 3D display information corresponding to the transformed traffic regulations and/or traffic policeman's action information for the current road section.

Further, the step of displaying virtual 3D display information corresponding to the driving assistance information is implemented by at least one of the following modes: when abnormal rut information is sensed, displaying virtual 3D display information corresponding to the determined abnormal rut area and/or virtual 3D display information of warning information indicating that this area is an abnormal rut area; when traffic signs within a road area that the current vehicle has passed by are to be displayed, displaying virtual 3D display information corresponding to the acquired traffic signs within the road area that the current vehicle has passed by; when it is sensed that there is a traffic sign and/or a traffic light at a crossroad where the current vehicle is located and the traffic sign and/or the traffic light fulfills a predetermined display condition, displaying virtual 3D display information corresponding to the traffic sign and/or the traffic light at this crossroad; when information about buttons in a dashboard is to be displayed, displaying virtual 3D display information corresponding to at least one of the following pieces of information: location information of the buttons, function name information of the buttons, operation instruction information of the buttons, and the buttons; and, when parking area information is to be displayed, displaying virtual 3D display information corresponding to at least one of areas where parking is allowed and it is appropriate for parking, areas where parking is allowed but it is not appropriate for parking, and areas where parking is not allowed.

The sensing can comprise at least one of recognition, probing and detection by using a machinery apparatus, and will not be repeated here.

The abnormal rut information is a travelling rut of a vehicle that fulfills the abnormal rut decision condition in a traveling state, and the abnormal rut area is an area having abnormal rut information.

The abnormal rut information comprises at least one of the following: rut information indicating the direction of a rut edge line is inconsistent with the direction of the lane line and/or the lane edge line; rut information indicating the direction of a rut edge line is inconsistent with the direction of all rut edge lines; and, rut information having a braking mark.

Whether the generated rut edge line being abnormal or not can be decided by the following method: deciding whether a vector field constructed by a rut edge line generated at a certain moment of time is quite different from the direction of a vector field constructed by other/all rut edge lines, and if so, determining that the generated rut edge line is an abnormal rut edge line; and/or, deciding whether a rut edge line has an obvious braking mark, and if so, determining that the generated rut edge line is an abnormal rut edge line.

The predetermined display condition comprises at least one of the following: a traffic sign and/or a traffic light is damaged; a traffic sign and/or a traffic light is not displayed clearly; a traffic sign and/or a traffic light is not completely within the current visual range of the driver; and the driver's instruction.

Further, the step of determining, based on information acquired during the driving process, driving assistance information can be implemented by at least one of the following modes: determining whether the road surface rut information has abnormal rut information or not, and if so, determining there is an abnormal rut area; when traffic signs within a road area that the current vehicle has passed by are to be displayed, determining, from the acquired multimedia information and/or a traffic sign database, traffic signs within the road area that the current vehicle has passed by; and, when parking area information is to be displayed, according to at least one of the presence of a NO PARKING sign or like in the surrounding area of the current vehicle, the size of the current vehicle and the current road surface condition, determining at least one of areas where parking is allowed and it is appropriate for parking, areas where parking is allowed but it is not appropriate for parking, and areas where parking is not allowed.

Further, the step 102 comprises: highlighting virtual 3D display information corresponding to the rut information.

Further, the step of displaying virtual 3D display information corresponding to the acquired traffic signs within the road area that the current vehicle has passed by comprises: adjusting, according to the current position of the vehicle and the virtual 3D display information corresponding to the traffic signs within the road area that the current vehicle has passed by, virtual 3D display information corresponding to the traffic signs within the road area that the current vehicle has passed by, and displaying the adjusted virtual 3D display information corresponding to the traffic signs.

Further, the step 102 comprises: determining a display mode corresponding to virtual 3D display information; and displaying, based on the determined display mode, virtual 3D display information corresponding to the driving assistance information.

The display mode comprises at least one of the following: the display position of virtual 3D display information, the display pose of virtual 3D display information, the display size of virtual 3D display information, the display starting time of virtual 3D display information, the display ending time of virtual 3D display information, the display duration of virtual 3D display information, the display detailedness of contents of virtual 3D display information, the presentation mode for virtual 3D display information, and the display relationship between multiple pieces of virtual 3D display information.

The presentation mode comprises at least one of the following: words, icons, animations, sound, light and vibration.

Further, the method further comprises at least one of the following: when there are multiple pieces of virtual 3D display information to be displayed, merging the multiple pieces of virtual 3D display information to be displayed, and displaying the processed virtual 3D display information; and, when multiple pieces of virtual 3D display information to be displayed are displayed simultaneously, semantically integrating the multiple pieces of virtual 3D display information to be displayed, and displaying the processed virtual 3D display information.

Further, the method further comprises at least one of the following: displaying, at a salient position within the current field of view of the driver, virtual 3D display information corresponding to driving assistance information having a priority higher than a first preset priority, and adjusting the position for displaying the virtual 3D display information in real time according to the position of the driver's sight; and, displaying virtual 3D display information corresponding to driving assistance information having a priority higher than the first preset priority, and pausing and/or stopping displaying virtual 3D display information corresponding to driving assistance information having a priority lower than a second preset priority.

The salient position can be at least one of a central area of the current field of view of the driver, a fixation area of the driver's sight, areas where the driver's sight stays for a long period of time and an area directly facing the driver.

The first preset priority and/or the second priority can be defined according to the driver's instruction; or, the driving assistance information can be adaptively classified according to at least one of the sensed road condition, the situation of this vehicle, the driver's intention and the sematic analysis of the driving assistance information.

Further, the step 102 comprises: according to at least one of the current state of the vehicle, the current road condition information and the system latency condition of the apparatus, determining at least one of the display starting time, the display ending time and the display duration of the virtual 3D display information; and, displaying, according to at least one of the determined display starting time, display ending time and display duration of the virtual 3D display information, virtual 3D display information corresponding to the driving assistance information.

Further, when there are multiple pieces of virtual 3D display information to be displayed corresponding to the driving assistance information and there is an occlusion relationship between the multiple pieces of virtual 3D display information to be displayed, further comprise at least one of the following: displaying only a non-occluded portion of the virtual 3D display information according to a positional relationship between the multiple pieces of virtual 3D display information having an occlusion relationship therebetween; at different display time, displaying virtual 3D display information among the multiple pieces of virtual 3D display information having an occlusion relationship therebetween, respectively; and, adjusting at least one of the display position, the detailedness of contents and the presentation mode for at least one of the multiple pieces of virtual 3D display information having an occlusion relationship therebetween, and displaying, according to the adjusted mode, each of the multiple pieces of virtual 3D display information having an occlusion relationship therebetween.

Further, the step 102 comprises: at a preset display position, displaying virtual 3D display information to be displayed corresponding to the driving assistance information.

The preset display position comprises at least one of the following:

a display position aligned with the real driving assistance information, an area position where the driving of the driver will not be interfered, a salient position within the current field of view of the driver, a position where the field of view of the driver is relatively open, and a position to which insufficient attention is paid by the driver.

Further, the method further comprises: rendering in advance virtual 3D display information to be displayed; when a preset display trigger condition is fulfilled, acquiring, from the virtual 3D display information rendered in advance, virtual 3D display information to be displayed, adjusting, according to the current environment, the presentation mode for the virtual 3D display information, and displaying the virtual 3D display information according to the adjusted presentation mode; and, adjusting, according to the current environment, the display mode for the virtual 3D display information in real time, and displaying the virtual 3D display information according to the adjusted display mode.

The preset display trigger condition can be defined according to the driver's instruction; or, the preset display trigger condition can be adaptively defined according to at least one of the sensed road condition, the situation of this vehicle, the driver's intention and the sematic analysis of the driving assistance information.

This embodiment of the present invention provides an AR method for driving assistance. Compared with the prior art, in this embodiment of the present invention, driving assistance information is determined based on information acquired during the driving process, and virtual 3D display information corresponding to the driving assistance information is displayed. That is, driving assistance information during the driving process is determined by the information acquired during the vehicle travelling process, and virtual 3D display information corresponding to the driving assistance information during the driving process is presented to a driver in a visual and/or auditory manner so as to inform or warn the driver. Accordingly, the application of the AR technology in the vehicle travelling process can assist a driver in better mastering driving information during the vehicle travelling process, and the user experience can be thus improved.

In this embodiment of the present invention, FIG. 1 shows an overall flowchart of a display mode for a driving assistance apparatus (referred to as "apparatus" hereinafter) described herein, and the method can be applied to an augmented/mixed reality head-mounted display device (a near-to-eye display device) worn by the driver during the driving process (for example, a pair of 3D augmented reality glasses), and/or a vehicle-mounted display device arranged on the vehicle (for example, a 3D head-up display). It is to be noted that the apparatus can comprise multiple identical or different display devices; and, when the display devices are different, the implementations are different and will be described below.

In the overall flowchart of the apparatus in this embodiment of the present invention, the contents executed in the steps are as follows: in step S110 (not shown): the apparatus determines one or more pieces of target driving assistance information to be displayed; in step S120 (not shown): information is acquired and processed to generate target driving assistance information content; in step S130 (not shown): a display mode for the one or more pieces of target driving assistance information is determined; and, in step S140 (not shown): virtual 3D AR information corresponding to the one or more pieces of target driving assistance information is displayed.

AR information except for AR objects is presented in at least one of the following presentation modes: words, icons, animations, sound, light and vibration, for example, an arrow icon with words; and the AR objects can comprise, but not be limited to, information presented in form of real objects, for example, a virtual traffic light.

The AR information and the AR objects are often mentioned simultaneously hereinafter. Although not all AR objects in the AR information need to be aligned with real objects, the AR objects generally refer to virtual objects that need to be aligned with real objects during the display; and, the AR information other than AR objects generally refer to virtual information that do not need to be aligned with real objects during the display.

In the step S110, the apparatus can select zero piece of target driving assistance information, that is, virtual 3D display information corresponding to the target driving assistance information is not displayed in the current scene.

In the step S110, the apparatus can adaptively determine target driving assistance information to be displayed by recognizing a scene, or can acquire target driving assistance information to be displayed by means of user interaction; or, the two modes can be used in combination.

The target driving assistance information can comprise, but not be limited to, prompt information related to the traffic safety, driving environment, information indication of traffic and road condition or more, traffic regulations, in-vehicle information, or more.

Specifically, a target object related to the target driving assistance information during the driving process can comprise, but not be limited to, lane lines, lane dividing rails, lanes, surrounding motor vehicles, surrounding non-motor vehicles, surrounding pedestrians, surrounding trees, surrounding buildings, road surface ruts, information indication of traffic and road condition or more, traffic policemen, objects within a blind area of a side-view mirror, objects on a rear seat in this vehicle, an external area of the trail, the dashboard, or more.

In the step S130, the determination of a display mode comprises at least one of the following: the display position, display pose, display size, display starting time and display ending time of one or more pieces of AR information, and/or when displaying multiple pieces of AR information simultaneously, the display position and/or pose, display starting time, display ending time, display duration, display detailedness of contents and presentation mode of each of multiple pieces of AR information, and a relationship between multiple pieces of AR information to be displayed.

Embodiment 1

This embodiment provides a method for displaying driving assistance information.

Figure 2:
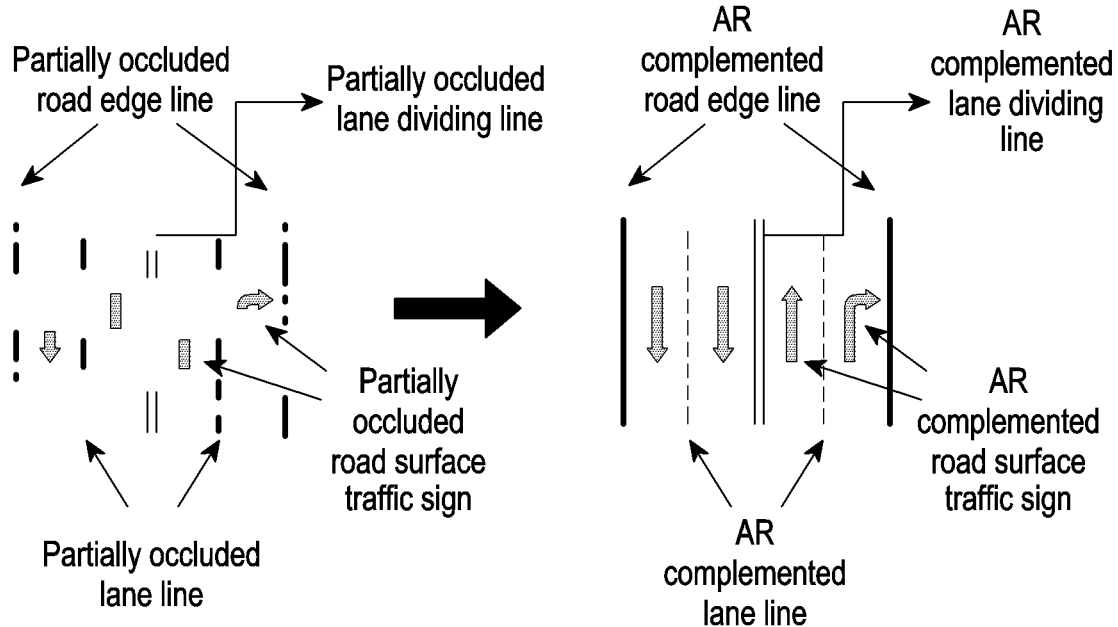
FIG. 2 is a schematic view of determining road information when the road surface is not covered completely, according to an embodiment of the present invention.

The method is used for displaying prompt information including at least one of lane lines, road edge lines, road surface traffic signs, road surface traffic markings and other information indications when the road surface is covered or occluded partially, and displaying corresponding AR driving assistance information, as shown in FIG. 2. The occlusions for lane lines on the road can comprise, but not be limited to, fallen leaves, accumulated snow, accumulated water, mud, oil or more, or a combination thereof.

The method in this embodiment comprises the following steps.

Step S1101 (not shown): An apparatus determines whether to display road information.

The step S1101 can be an implementation of determining, by the apparatus, one or more pieces of target driving assistance information to be displayed.

In this embodiment of the present invention, the apparatus determines road information (which can comprise, but not be limited to, lane lines, road edge lines, road surface traffic signs and road surface traffic markings) in the surrounding of this vehicle by image detection and recognition. The apparatus can be always kept in a detection and recognition state and adaptively activate the display function in the case of a partially occluded or covered road surface; or, the apparatus can activate the detection and recognition function and/or the display function according to a user's instruction. The user's instruction can be borne by gestures, voice, physical buttons and identification biomarkers such as fingerprint.

Step S1201 (not shown): The apparatus detects and recognizes the road information to generate target driving assistance information content.

The step S1201 can be an implementation of acquiring and processing information to generate target driving assistance information content.

In this embodiment of the present invention, the apparatus locates and recognizes, from one or more images/videos, a visible portion (i.e., a portion not covered or occluded completely) including at least one of lane lines, road edge lines, road surface traffic signs and road surface traffic markings by an image processing technology and a recognition technology; and, a complete lane line is formed by connecting the visible sections of the lane line (if the lane line is a dashed line, the dashed line is complemented), a complete road edge line is formed by connecting the visible sections of the road edge line, and the type of the road surface traffic sign and/or the road surface traffic marking is recognized according to the visible portion of the road surface traffic sign and/or the road surface traffic marking.

Specifically, in a single image, the visible sections of the lane line and the visible sections of the road edge line can be extracted by an image edge extraction algorithm and/or a color clustering algorithm, and a wrong section can be eliminated based on the prior knowledge that the lane line and the road edge line are generally regular straight lines or smooth arcs; and the outline of the partially occluded road surface traffic sign and/or the road surface traffic marking can be extracted by the image edge extraction algorithm and/or the color clustering algorithm, and a complete road surface traffic sign and/or road surface traffic marking is matched and acquired from a road surface traffic sign database.

In this embodiment of the present invention, the lane lines, the road edge lines, the road surface traffic signs and the road surface traffic markings can also be directly recognized and located by a detection and recognition algorithm. During the recognition, the detection and recognition can be assisted by the road traffic domain knowledge and/or a road map. For example, since a single white dashed line and a single white solid line both are manifested as a single irregular white dashed line on a road that is covered or occluded partially, based on the road traffic domain knowledge, the apparatus can determine whether the detected single white dashed line corresponds to a real single white dashed line or a real single white solid line by detecting whether the detected single white dashed line has a section having a length more than a specified length. Further, based on the road traffic domain knowledge and the road map, the apparatus can determine, according to the position and traffic meaning of the detected single white dashed line, whether the detected single white dashed line corresponds to a real single white dashed line or a real single white solid line.

For example, if the detected single white dashed line is in the middle of the road, according to the road traffic domain knowledge, the detected single white dashed line corresponds to a real single white solid line.

Further, during the recognition, a correct road surface traffic sign and/or road surface traffic marking can be generated based on the road traffic domain knowledge and/or the road map. For example, a go-straight direction arrow and a right-turn direction arrow on the road surface are manifested as rectangles in the case of the arrows are partially covered or occluded. Accordingly, the arrows cannot be distinguished. However, if the lane where the detected rectangle is located is displayed as a right-turn lane in the road map, the apparatus can distinguish that the road surface traffic sign is a right-turn direction arrow.

Particularly, when there are multiple spatial images and/or multiple temporal images simultaneously, the apparatus can recognize at least one of the lane line, the road edge line, the road surface traffic sign and the road surface traffic marking by cooperatively using the multiple images, so that an error caused by using a single image is eliminated and the spatial and/or temporal consistence of the result of recognition is ensured.

For example, the apparatus can recognize that the lane line on a certain section of road surface corresponds to a real single white solid line, then trace a same lane line during the subsequent driving, and keep the recognition of the lane line as a single white solid line.

Step S1301 (not shown): A display mode for the target driving assistance information content is determined.

The step S1301 can be an implementation of determining a display mode for one or more pieces of target driving assistance information.

In this embodiment of the present invention, the apparatus acquires the position and pose of a real object relative to a display device by a localization algorithm, so that the displayed AR information can be aligned with corresponding real objects.

Particularly, in order to reduce the latency, for a same real object, according to a motion model of this vehicle, a relationship in at least one of relative position, pose and/or size between this real object and this vehicle currently, the apparatus can then predict a relationship in at least one of relative position, pose and/or size between this real object and this vehicle at a future moment of time, so that the AR information corresponding to the target driving assistance information is prepared in advance.

Specifically, when the road information in the surrounding of this vehicle is acquired by a single camera, a partial road in the surrounding of this vehicle can be approximately considered as a plane, feature points can be extracted from road images, and a relationship in relative position and pose between the road and the camera can be acquired by solving a homography matrix; and, more accurately, feature tracking can be performed on an image sequence by a visual odometry, wherein the features are collected from a real object to be aligned, for example, the lane line section, the road edge section, the outline of the road surface traffic sign, and the road surface traffic marking or more, so that the relationship in relative position and pose between the real object and the camera is acquired. Particularly, the extraction and tracking of feature points can be assisted by the image recognition and segmentation, so that a mismatch is eliminated and the speed is accelerated.

In this embodiment of the present invention, when a single camera is used, the size information of the real object can be obtained by the following three modes (the three modes can be used individually or in combination): 1) the apparatus can acquire size information by calibrating a camera at a mounting and fixing height of the vehicle in advance; 2) the apparatus can acquire the physical size of the real object according to the prior knowledge in the road traffic field and then obtain the size information, for example, the apparatus can acquire the specified width for local lanes according to the prior knowledge; and, 3) when the apparatus uses an image sequence, the size information can be acquired based on the actual speed of movement, distance and other information of the vehicle.

In this embodiment of the present invention, when the road information in the surrounding of this vehicle is acquired by using a single camera in combination with at least one of a stereo camera, a depth camera, a laser sensor, a radar sensor and an ultrasonic sensor, the relationship in relative position and pose between the real object and the camera can be acquired by a mode similar to the case of using a single camera, and this mode will not be repeated here. Particularly, when at least one of the calibrated stereo camera, depth camera, laser camera, radar sensor and ultrasonic sensor is used, the size information of the real object can be acquired directly; or, cross validation can be performed by using an estimated size acquired by the mode as in the case of using a single camera.

In this embodiment of the present invention, the size information can also be acquired by using other sensors in combination with a single camera. For example, the size information can be estimated by fusing data from an encoder disk and data from a single camera. For another example, the size information can be estimated by fusing data from an inertial sensor unit (including an accelerometer and a gyroscope) and data from a single camera. The apparatus can also cooperatively use data from these sensors to acquire the size information.

In this embodiment of the present invention, by the above mode, a relationship in position, pose and size between a real object and at least one exterior view camera (i.e., a camera for capturing the external environment of this vehicle) on this vehicle or the apparatus.

In this embodiment of the present invention, in order to align the AR information with a real object, the apparatus needs to further estimate relationships in relative position, pose and size between eyes and the real object. The steps and the mode for estimation are related to the type of a display device of the apparatus, and will be described below on the following two cases that the display device is a single head-mounted display device or the display device is a single vehicle-mounted display device. When the display unit of the apparatus comprises multiple head-mounted display devices and/or multiple vehicle-mounted display devices, the following methods can be used by direct combination and then adjustment, and this will not be repeated here.

1) When the display device is a single head-mounted display device, the relationship in relative position and pose between the eyes and the display device is relatively fixed and can be calibrated in advance (the relationship needs to be recalibrated occasionally when in use; for example, the relationship in position, pose and size needs to be recalibrated after a user has adjusted the position of the head-mounted display device).

1.1) When the relationship in position, pose and size between the real object and an exterior view camera (i.e., a camera for capturing the external environment of this vehicle) on the apparatus has been acquired, since the relationship in position, pose and size between the exterior view camera on the apparatus and the display device is relatively fixed, the apparatus can estimate the relationship in relative position, pose and size between eyes and the real object (eyes←calibration→the display device←calibration→the exterior view camera on the apparatus←estimation→the real object).

1.2) When the relationship in position, pose and size between the real object and an exterior view camera (i.e., a camera for capturing the external environment of this vehicle) on this vehicle has been acquired, the apparatus still needs to acquire the relationship in relative position and pose between the display device and the exterior view camera. Implementations are different according to the apparatus hardware. Two modes 1.2.1) and 1.2.2) will be described below.

1.2.1) The apparatus can acquire, by using an exterior view camera on the apparatus, a relationship in relative position, pose and size between an exterior view camera on this vehicle and the exterior view camera on the apparatus. The acquisition can be performed as follows: a location marker is pasted at a position where the relative position, pose and size of the vehicle-mounted display device are fixed, and the exterior view camera on the apparatus estimates, by using the location marker, a relationship in relative position, pose and size between the exterior view camera on the apparatus and the exterior view camera on this vehicle. The acquisition can also be performed as follows: the exterior view camera on this vehicle is treated as an object in this scene, and the mode of extracting and tracking feature points based on fusion of images and/or multiple sensors and/or the detection mode or more described above is used, for example, a Simultaneous Localization and Mapping (SLAM) technology and a target object tracking technology. That is, (eyes←calibration→the display device←calibration→the exterior view camera on the apparatus←estimation→the exterior view camera on this vehicle←estimation-→the real object).

1.2.2) The apparatus can acquire, by an interior view camera (i.e., a camera for capturing the internal environment of this vehicle, e.g., the position of the driver) on this vehicle, a relationship in relative position, pose and size between the display device and the interior view camera on this vehicle. The acquisition mode can be based on a location marker on the display device, and/or based on the mode of extracting and tracking feature points based on fusion of images and/or multiple sensors and/or the detection method or more described above, for example, an SLAM technology and a target object tracking technology. The relationship in relative position, pose and size between the interior view camera on this vehicle and the exterior view camera on this vehicle is relatively fixed and can be calibrated in advance (the relationship needs to be recalibrated occasionally when in use; for example, the relationship in position, pose and size needs to be recalibrated after the vehicle is jolted severely). That is, (eyes←calibration→the display device-←estimation→the interior view camera on this vehicle←calibration→the exterior view camera on this vehicle←estimation→the real object).

2) When the display device is a single vehicle-mounted display device, the relationship in relative position and pose between the display device and an exterior view camera on this vehicle is relatively fixed and can be calibrated in advance (the relationship needs to be recalibrated occasionally when in use; for example, the relationship in position, pose and size needs to be recalibrated after the vehicle is jolted severely). Particularly, the relationship in relative position, pose and size between an exterior view camera on the apparatus and the exterior view camera on this vehicle can also considered to be relatively fixed. The two exterior view cameras can also be a same camera. In this case, it is not necessary to distinguish the exterior view camera on this vehicle from the exterior view camera on the apparatus. In order to acquire the relationship in relative position, pose and size between eyes and the real object, the apparatus only needs to acquire a relationship in relative position, pose and size between the eyes and the display device. Implementations are different according to the apparatus hardware. Two modes 1.3) and 1.4 will be described below.

1.3) The apparatus can acquire, by using an exterior view camera worn on the driver's head, a relationship in relative position, pose and size between the vehicle-mounted display device and the head-mounted exterior view camera. A relationship in relative position, pose and size between the head-mounted exterior view camera and the eyes can be considered to be relatively fixed and can be calibrated in advance (the relationship needs to be recalibrated occasionally when in use; for example, the relationship in position, pose and size needs to be recalibrated after a user has adjusted the position of the head-mounted camera). The acquisition mode can be as follows: a location marker is pasted at a position where the relative position and pose of the vehicle-mounted display device is fixed, and the head-mounted exterior view camera estimates a relationship in relative position and pose with the vehicle-mounted display device by using the location marker. The acquisition mode can also be as follows: the vehicle-mounted display device on this vehicle is treated as an object in this scene, and the mode of extracting and tracking feature points based on fusion of images and/or multiple sensors and/or the detection method or more described above is used, for example, an SLAM technology and a target object tracking technology. That is, (eyes←calibration→the head-mounted exterior camera←estimation→the display device←calibration→the exterior view camera←estimation→the real object).

1.4) The apparatus can acquire, by an interior view camera (i.e., a camera for capturing the internal environment of this vehicle, e.g., the position of the driver) on this vehicle, relationships in relative position, pose and size between eyes and the interior view camera on this vehicle. The acquisition mode can be based on a head-mounted location marker of the driver. The relationship in relative position, pose and size between the eyes and the head-mounted location marker can also be considered to be relatively fixed, and can be calibrated in advance (the relationships need to be recalibrated occasionally when in use; for example, the relationship in position, pose and size needs to be recalibrated after a user has adjusted the position of the head-mounted location marker). The acquisition mode can also be an image-based head/eyes/gaze localization and tracking technology, by which the apparatus locates the head of the driver by an image or a video in the interior view camera on this vehicle and then estimates a relationship in relative position and pose between the eyes and the interior view camera based on the result of localization of the head. The acquisition mode can also be an image-based eye localization and tracking technology, by which the apparatus directly estimates a relationship in relative position and pose between the eyes and the interior view camera by using an image or a video in the interior view camera on this vehicle. The relationship in relative position, pose and size between the interior view camera on this vehicle and the vehicle-mounted display device on this vehicle is relatively fixed and can be calibrated in advance (the relationship needs to be recalibrated occasionally when in use; for example, the relationship in position, pose and size needs to be recalibrated after the vehicle is jolted severely). That is, (eyes-←estimation→the interior view camera on this vehicle←calibration→the display device←calibration→the exterior view camera on this vehicle←estimation→the real object).

In this embodiment of the present invention, expect for the display position, pose and size of the AR information, the apparatus also needs to determine the presentation mode for the AR information, including but not limited to: color, brightness, transparency, icon format or more. For the AR information to be aligned with the real object, the apparatus preferably presents the AR information in color and format consistent with the real object.

For example, if the real lane line on the road should be a single white dashed line, the apparatus preferable presents the AR lane line in form of a single white dashed line; and, if the presentation of the AR information in color and format consistent with the real object will make the AR information not be recognized and understood clearly by the driver, the apparatus adaptively selects better color and format. The apparatus collects road images or videos by one or more exterior view cameras, and projects AR information onto the images or videos in a predicted presentation mode according to the estimated position, pose and size. By an image/video analysis technology, the contrast between the AR information and the surrounding scene can be acquired, and whether the predicted presentation mode being appropriate is further determined; and, if not, the predicted presentation mode will be replaced by the presentation mode having a higher recognizability according to the brightness, color and more of the scene. For example, when the road is partially occluded by snow, the difference between the AR lane line and the road surface will be too small if the AR lane line is presented as a single white dashed line, so that the apparatus can adaptively select, for example, a single blue dashed line to present the AR lane line.

Step S1401 (not shown): AR information corresponding to the generated target driving assistance information is displayed.

The step S1401 can be an implementation of displaying virtual 3D AR information corresponding to one or more pieces of target driving assistance information.

In this embodiment of the present invention, the apparatus displays, according to the relationships in relative position, pose and size between the eyes and the real object, the AR information on the display device in the presentation mode determined in the step S1301, so that the displayed AR information can be aligned with the corresponding real object.

Embodiment 2

Figure 3:
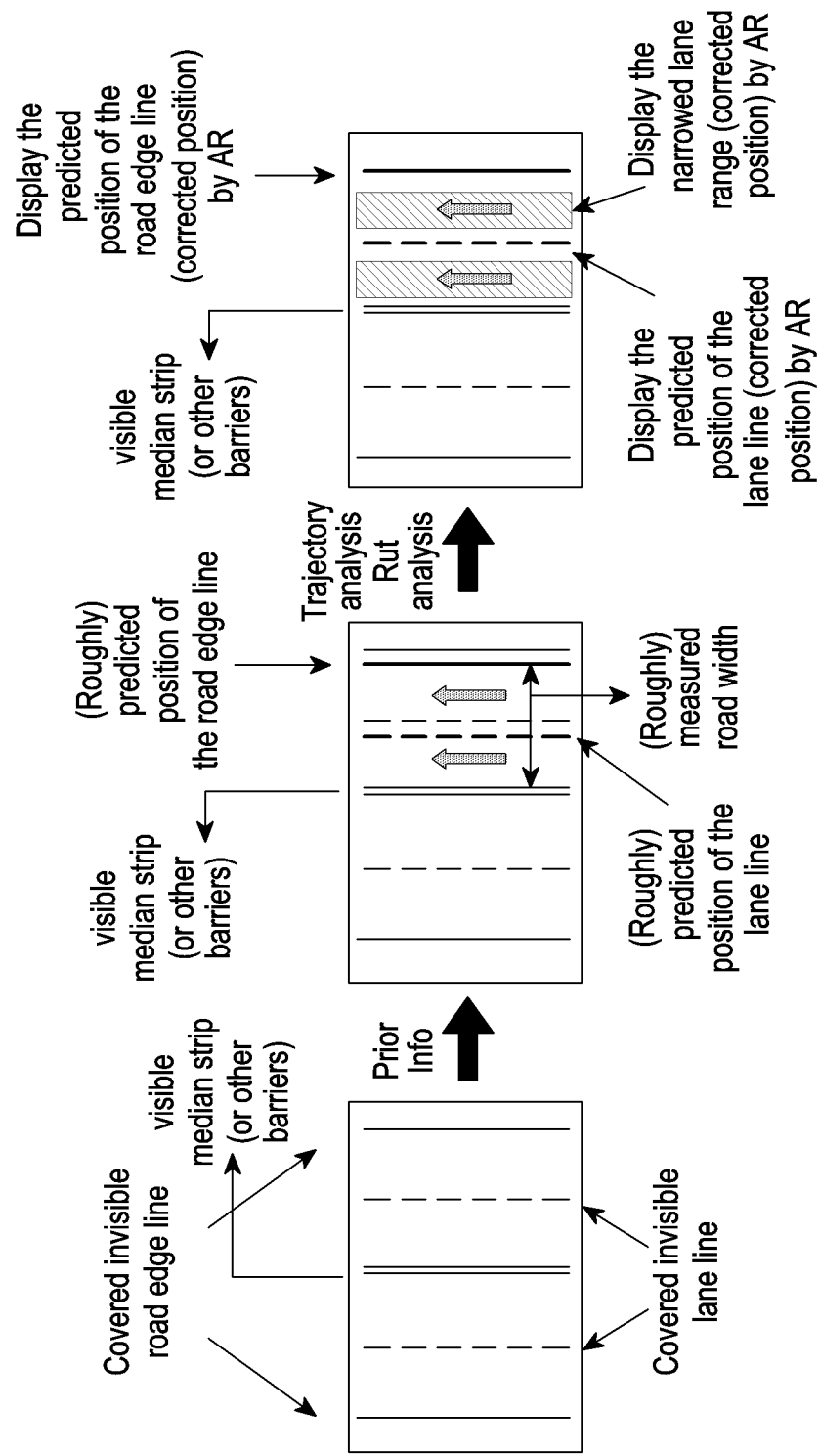
FIG. 3 is a schematic view of determining road information when the road surface is covered completely and the median strip is visible, according to an embodiment of the present invention.

This embodiment of the present invention provides a method for displaying driving assistance information. The method is applied to a road having a completely covered or occluded road surface and having a sensible median strip (or other visible traffic sign barriers) and used for displaying prompt information about a lane line, a lane, a rut, a road surface traffic sign, a road surface traffic marking, road conditions or other information indication and displaying corresponding AR driving assistance information, as shown in FIG. 3. The occlusions for lane lines on the road can comprise, but not be limited to, accumulated snow, accumulated water, mud, oil or more, or a combination thereof.

The method in this embodiment of the present invention comprises the following steps.

Step S1102 (not shown): An apparatus determines whether to display road information.

The step S1102 can be an implementation of determining, by the apparatus, one or more pieces of target driving assistance information to be displayed.

In this embodiment of the present invention, the apparatus determines road information (which can comprise, but not be limited to, lane lines, road edge lines, road surface traffic and road condition and other information indications) in the surrounding of this vehicle by image recognition. The apparatus can be always kept in a recognition state, and can adaptively activate a display function in the case of a sensible road having a completely covered or occluded road surface and having a median strip (or other visible traffic sign barriers). Or, the apparatus can activate a recognition function and/or a display function according to the user's instruction. The user's instruction can be borne by gestures, voice, physical buttons and identification biomarkers such as fingerprint.

Step S1202 (not shown): The apparatus senses road information to generate target driving assistance information content.

The step S1202 can be an implementation of acquiring and processing information to generate target driving assistance information content.

In this embodiment of the present invention, the apparatus detects, recognizes and locates a median strip (or other visible traffic sign barriers), then estimates the width of the road in the travelling direction of this vehicle, and estimates the position of the lane line and the road edge.

Specifically, first, the apparatus recognizes and locates, from one or more images/videos, a visible median strip (or other visible traffic sign barriers) by an image processing technology and a recognition technology, and uses the visible median strip as a reference of the middle of the road; and the apparatus can also recognize and locate by the similar technology when there is a lane dividing rail (or other visible traffic sign barriers) on the road edge. An area between a road edge dividing rail (or other visible traffic sign barriers) and the median strip (or other visible traffic sign barriers) is a travelling area in the travelling direction of this vehicle.

In this embodiment of the present invention, when there is no lane dividing rail (or other visible traffic sign barriers) on the road edge, the apparatus can acquire a distance from the median strip (or other visible traffic sign barriers) to an object outside the lane (for example, a bicycle, a tree and a house) by using at least one of a single camera, a stereo camera, a depth camera, a laser sensor, a radar sensor and an ultrasonic sensor. During the acquisition of the distance, the orientation of the camera and/or other sensors will be taken into consideration. The measured distance is corrected to a direction perpendicular to the median strip (or other visible traffic sign barriers), to obtain a shortest robust statistic distance from the median strip (or other visible traffic sign barriers) to the object outside the lane (for example, a pedestrian, a bicycle, a tree and a house). The shortest robust statistic distance should be a statistical distance measured for multiple times at multiple positions during the travelling of this vehicle. The shortest robust statistic distance is an upper limit of lane width in the travelling direction of this vehicle. When there is a road map, the upper limit can be further verified and optimized according to the road width shown in the map.

The orientation of the camera and/or other sensors can be obtained by the following mode: the apparatus first recognizes, from an image sequence, an extension direction of the median strip (or other visible traffic sign barriers), and estimates a relationship between the camera and the orientation of this direction; and the relationships in relative position, pose and size between the camera and other sensors on this vehicle can be considered being fixed and can be calibrated in advance (the relationship needs to be recalibrated occasionally when in use; for example, the relationship in position, pose and size needs to be recalibrated after the vehicle is jolted severely), so that the orientation of the camera and/or other sensors can be obtained.

In this embodiment of the present invention, within the upper limit of lane width, based on the road traffic domain knowledge and/or the road map, the apparatus can predict, according to the prior knowledge such as the width of a lane and/or the number of lanes, the approximate position of each lane line and the approximate position of the road edge line. The range of a map where this vehicle is located can be determined by jointly using the road map and a localization mode, including but not limited to radio signal localization and a GPS. The road map can be stored in advance into a storage space of the apparatus or this vehicle, or can be acquired in a network communication manner.

In this embodiment of the present invention, the apparatus can collect images and/or videos of surrounding vehicles and a completely covered road surface by using one or more cameras and/or a stereo camera and/or a depth camera, then analyze travelling trajectories of other vehicles and/or ruts on the road surface within a preset range of the current vehicle by object detection, object recognition and tracking technologies, and more accurately correct the predicted positions of the lane line and the road edge line. When there are a high-accuracy GPS and a high-accuracy road map, the apparatus can align the current road with the road map by using visual localization information and GPS localization information, so that the accuracy of prediction of the positions of the lane line and the road edge line is improved. The mode for recognizing and detecting ruts will be described in detail in Embodiment 4.

In this embodiment of the present invention, when there is a high-accuracy road map, the apparatus can align, based on the sensed road environment and by using the visual localization information and/or GPS localization information, the current road with the road map, so that the apparatus can acquire road surface information by the road map to generate corresponding target driving assistance information.

Step S1302 (not shown): A display mode for the target driving assistance information content is determined.

The step S1302 can be an implementation of determining a display mode for one or more pieces of target driving assistance information.

The step S1302 is similar to the step S1301 in Embodiment 1 and will not be repeated here. Particularly, considering it is possible that there is an error for the estimation of the lane range, that is, the estimated lane range is possible to include a portion of adjacent real lanes or road edges, in order to prevent the vehicle from travelling within a boundary area of two lanes or within a boundary area of a lane and a road edge, the apparatus narrows inward two sides of the estimated lane area and prepares target driving assistance information for only a central area of the estimated lane area.

Step S1402 (not shown): AR information corresponding to the generated target driving assistance information is displayed.

The step S1402 can be an implementation of displaying virtual 3D AR information corresponding to one or more pieces of target driving assistance information.

The step S1402 is similar to the step S1401 in Embodiment 1 and will not be repeated here.

Embodiment 3

This embodiment of the present invention provides a method for displaying driving assistance information. The method is applied to a road having a completely covered road surface and having no median strip (or other visible traffic sign barriers) and used for displaying prompt information about a lane line, a lane, a rut, a road surface traffic sign, a road surface traffic marking or other information indication and displaying corresponding AR driving assistance information. The occlusions for lane lines on the road can comprise, but not be limited to, accumulated snow, accumulated water, mud, oil or more.

The method in this embodiment of the present invention comprises the following steps.

Step S1103 (not shown): An apparatus determines whether to display road information.

The step S1103 can be an implementation of determining, by the apparatus, one or more pieces of target driving assistance information to be displayed.

In this embodiment of the present invention, the apparatus determines road information (which can comprise, but not be limited to, lane lines, road edge lines, road surface traffic and road condition and other information indications) in the surrounding of this vehicle by image recognition. The apparatus can be always kept in a recognition state, and can adaptively activate a display function in the case of a road having a completely occluded or covered road surface and having no median strip (or other visible traffic sign barriers). Or, the apparatus can activate a recognition function and/or a display function according to the user's instruction. The user's instruction can be borne by gestures, voice, physical buttons and identification biomarkers such as fingerprint.

Step S1203 (not shown): The apparatus senses road information to generate target driving assistance information content.

The step S1203 can be an implementation of acquiring and processing information to generate target driving assistance information content.

In this embodiment of the present invention, the apparatus estimates the road width, then estimates the position of a median dividing line for dividing two-way lanes (if the vehicle does not run on a one-way road), and estimates the positions of a lane line and a road edge.

Firstly, the apparatus estimates the road width. When there are lane dividing rails (or other visible traffic sign barriers) on two edges of the road, the apparatus can locate and recognize, from one or more images/videos, road edge dividing rails (or other visible traffic sign barriers) on two sides by an image processing technology and a recognition technology, and an area between the both is treated as a road surface area.

When there is a lane dividing rail (or other visible traffic sign barriers) on a road edge on only one side, the apparatus can recognize and locate the position of the road edge on this side as a reference by the image processing technology and the recognition technology; while on the side without lane dividing rail (or other visible traffic sign barriers), the apparatus can acquire a distance from the reference to an object (for example, a bicycle, a tree or a house) outside the road edge on the other side by using at least one of a single camera, a stereo camera, a depth camera, a laser sensor, a radar sensor and an ultrasonic sensor. During the acquisition of this distance, the orientation of the camera and/or other sensors will be taken into consideration. The measured distance is corrected to a direction perpendicular to the reference, to acquire a shortest robust statistical distance from the road edge on one side with the dividing rail (or other visible traffic sign barriers) to the object (for example, a pedestrian, a bicycle, a tree, a house or more) outside the road edge on the other side without dividing rail (or other visible traffic sign barriers). The shortest robust statistic distance should be a statistical distance measured for multiple times at multiple positions during the travelling of this vehicle, and the shortest robust statistic distance is an upper limit of road surface width. When there is a road map, the upper limit can be further verified and optimized according to the road width shown in the map. The orientation of the camera and/or other sensors can be obtained by the following mode: the apparatus recognizes, from an image sequence, an extension direction of a lane dividing rail (or other visible traffic sign barriers) on one side of the road, and estimates a relationship between the camera and the orientation of this direction; and the relationship in relative position, pose and size between the camera and other sensors on this vehicle can be considered being fixed and can be calibrated in advance (the relationship needs to be recalibrated occasionally when in use; for example, the relationship in position, pose and size needs to be recalibrated after the vehicle is jolted severely), so that the orientation of the camera and/or other sensors can be obtained.

Figure 4:
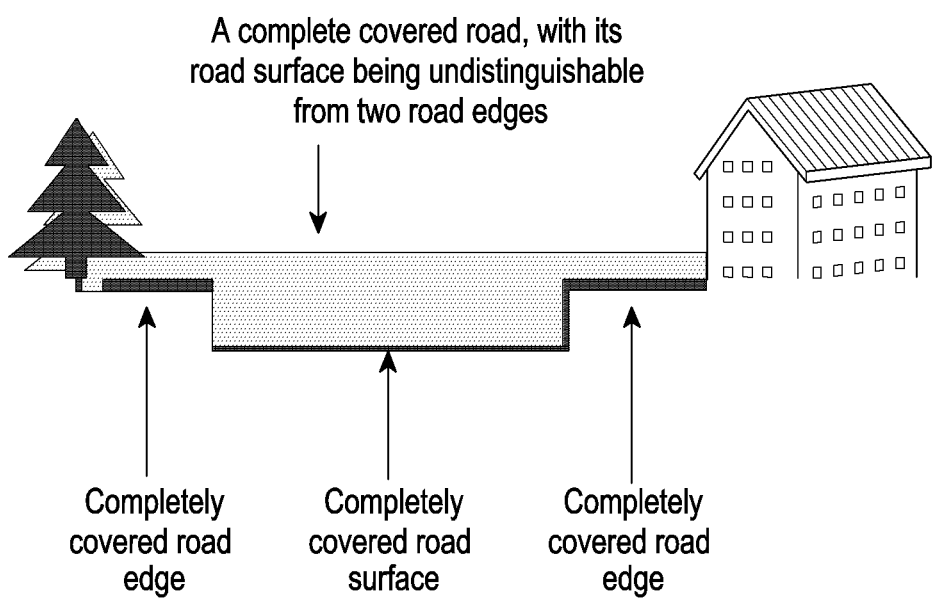
FIG. 4 is a schematic view when the road surface is covered completely and it is unable to distinguish the road surface and the road edge, according to an embodiment of the present invention.

When there are no lane dividing rails (or other visible traffic sign barriers) on road edges on both sides, as shown in FIG. 4, the apparatus can acquire a sum of distances from this vehicle to objects (for example, pedestrians, bicycles, trees, houses or more) outside the road edges on both sides by at least one of a single camera, a stereo camera, a depth camera, a laser sensor, a radar sensor and an ultrasonic sensor. During the acquisition of the sum of distances, the orientation of the camera and the width between sensors on two sides of this vehicle will be taken into consideration. The measured distance is corrected to a direction perpendicular to the road direction, to acquire a shortest robust statistical distance between the objects (for example, pedestrians, bicycles, trees, houses or more) outside the road edges on both sides. The shortest robust statistic distance should be a statistical distance measured for multiple times at multiple positions during the travelling of this vehicle, and the shortest robust statistic distance is an upper limit of road surface width. The orientation of the camera and/or other sensors can be obtained by the following mode.

Specifically, the apparatus recognizes, from an image sequence, an arrangement of roadside trees and/or an extension direction of a building surface, and estimates a relationship between the camera and the orientation of this direction. The relationships in relative position, pose and size between the camera and other sensors on this vehicle can be considered to be fixed and can be calibrated in advance (the relationship needs to be recalibrated occasionally when in use; for example, the relationship in position, pose and size needs to be recalibrated after the vehicle is jolted severely), so that the orientation of the camera and/or other sensors can be obtained.

Figure 5:
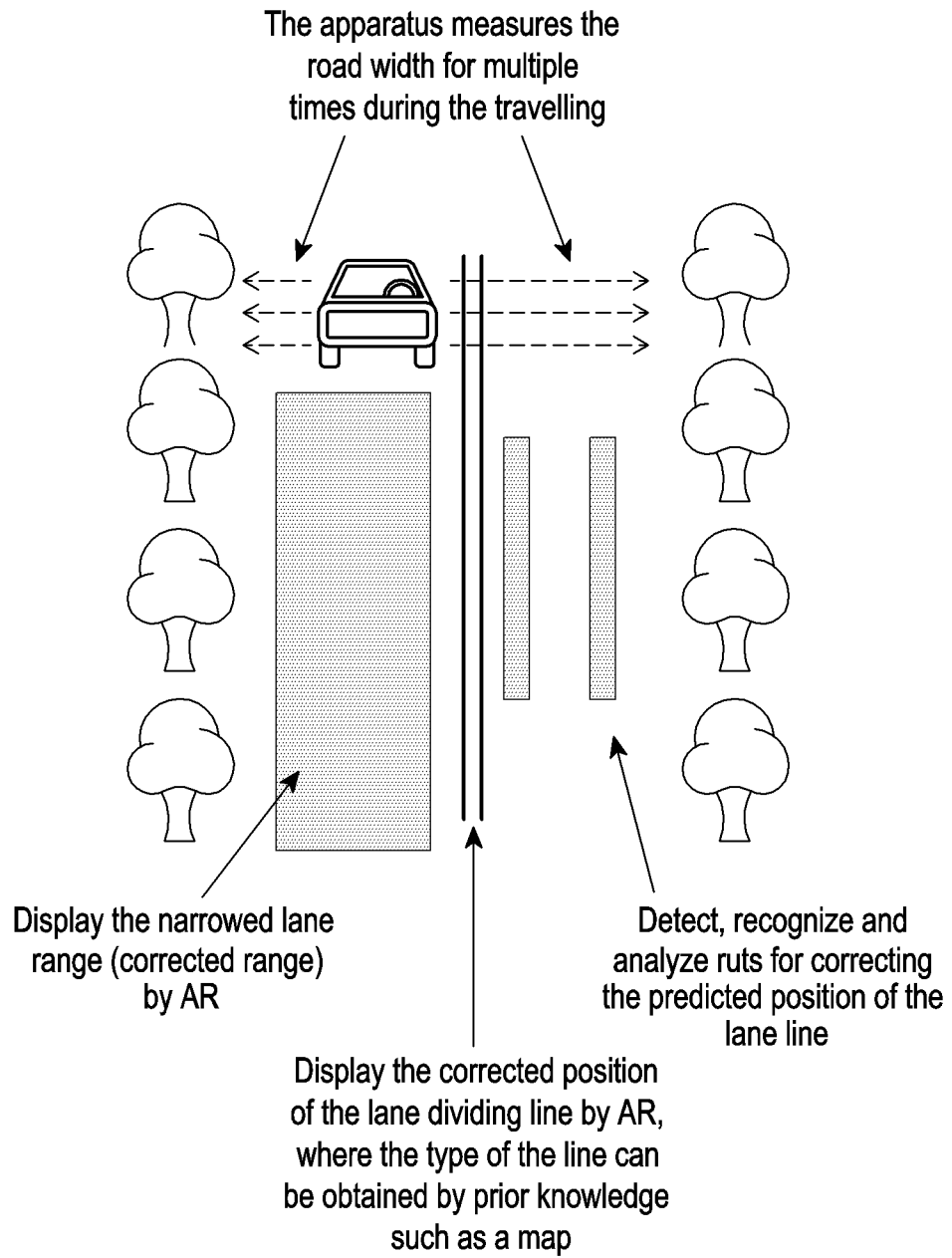
FIG. 5 is a schematic view of determining road information when the road surface is covered completely and the median strip is invisible, according to an embodiment of the present invention.

In this embodiment of the present invention, as shown in FIG. 5, within the estimated upper limit of the road surface range, based on the road traffic domain knowledge and/or the road map, the apparatus can predict, according to the width of each lane in each direction and/or the number of lanes, the approximate position of a central line of the road and uses this central line as a reference to estimate the approximate position of each lane line and the approximate position of the road edge line.

Considering that there will not be vehicles or ruts in two directions within this range simultaneously if the estimated lane range is correct, the apparatus can collect images and/videos of surrounding vehicles and the completely covered road surface by using one more or cameras and/or a stereo camera and/or a depth camera, then analyze travelling trajectories of other vehicles and/or ruts on the road surface within a preset range of the current vehicle by object detection, object recognition and tracking technologies, and more accurately correct the predicted positions of the lane line and the road edge line. When there are a high-accuracy GPS and a high-accuracy road map, the apparatus can align the current road with the road map by using visual localization information and GPS localization information, so that the accuracy of estimation of the positions of the lane line and the road edge line is improved. The mode for recognizing and detecting ruts will be described in detail in Embodiment 4.

In this embodiment of the present invention, when there is a high-accuracy road map, the apparatus can align, based on the sensed road environment and by using the visual localization information and/or GPS localization information, the current road with the road map, so that the apparatus can acquire road surface information by the road map to generate corresponding target driving assistance information.

Step S1303 (not shown): A display mode for the target driving assistance information content is determined.

The step S1303 can be an implementation of determining a display mode for one or more pieces of target driving assistance information.

The step S1303 is similar to the step S1301 in Embodiment 1 and will not be repeated here. Particularly, considering that it is possible that there is an error for the estimation of the lane range, that is, the estimated lane range is possible to include a portion of adjacent real lanes or road edges, in order to prevent the vehicle from travelling within a boundary area of two lanes or within a boundary area of a lane and a road edge, the apparatus narrows inward two sides of the estimated lane area and prepares target driving assistance for only a central area of the estimated lane area.

Step S1403 (not shown): AR information corresponding to the generated target driving assistance information is displayed.

The step S1403 can be an implementation of displaying virtual 3D AR information corresponding to one or more pieces of target driving assistance information.

The step S1403 is similar to the step S1401 in Embodiment 1 and will not be repeated here.

Embodiment 4

This embodiment of the present invention provides a method for displaying driving assistance information. The method is applied to a road having a completely covered or occluded road and used for displaying prompt information of rut information indication and displaying corresponding AR driving assistance display information. The occlusions for lane lines on the road can comprise, but not be limited to, accumulated snow, accumulated water, mud, oil or more.

The method in this embodiment of the present invention comprises the following steps.

Step S1104 (not shown): An apparatus determines whether to display rut-related information.

The step S1104 can be an implementation of determining, by the apparatus, one or more pieces of target driving assistance information to be displayed.

In this embodiment of the present invention, the apparatus determines road information (which can comprise but be not limited to lane lines, road edge lines, road surface traffic signs, road surface traffic markings, road conditions or other information indications) in the surrounding of this vehicle by image recognition. The apparatus can be always kept in a detection and recognition state and adaptively activate a display function in the case of a completely occluded or covered road; or, the apparatus can activate a detection and recognition function and/or a display function according to a user's instruction. The user's instruction can be borne by gestures, voice, physical buttons and identification biomarkers such as fingerprint.

Step S1204 (not shown): The apparatus detects road surface ruts.

The step S1204 can be an implementation of acquiring and processing information to generate target driving assistance information content.

In this embodiment of the present invention, first, the apparatus collects images or videos by using one or more cameras and then detects and locates ruts on the road surface by an image processing technology and a recognition technology.

Specifically, in a single image, the apparatus can locate a rut area by an image recognition technology, and ruts can be extracted by an image edge extraction algorithm and/or a color clustering algorithm. The apparatus can connect the detected rut edge sections according to the direction to form a successive rut edge line or can construct the rut edge sections into a vector field. When there are simultaneously multiple images spatially and/or simultaneously multiple images temporally, ruts can be recognized by jointly using the multiple images, and rut edge lines in the multiple images are connected together by feature tracking and pattern matching. An error caused by using a single image is eliminated, and the spatial and/or temporal consistence of the result of recognition is kept. During the pattern matching, the residence time of ruts (for example, the residence time is inferred from the depth of ruts) can be taken into consideration in order to eliminate a mismatch.

Step S1304 (not shown): A display mode for the rut-related driving assistance information content is determined.

The step S1304 can be an implementation of determining a display mode for one or more pieces of target driving assistance information.

Figure 6:
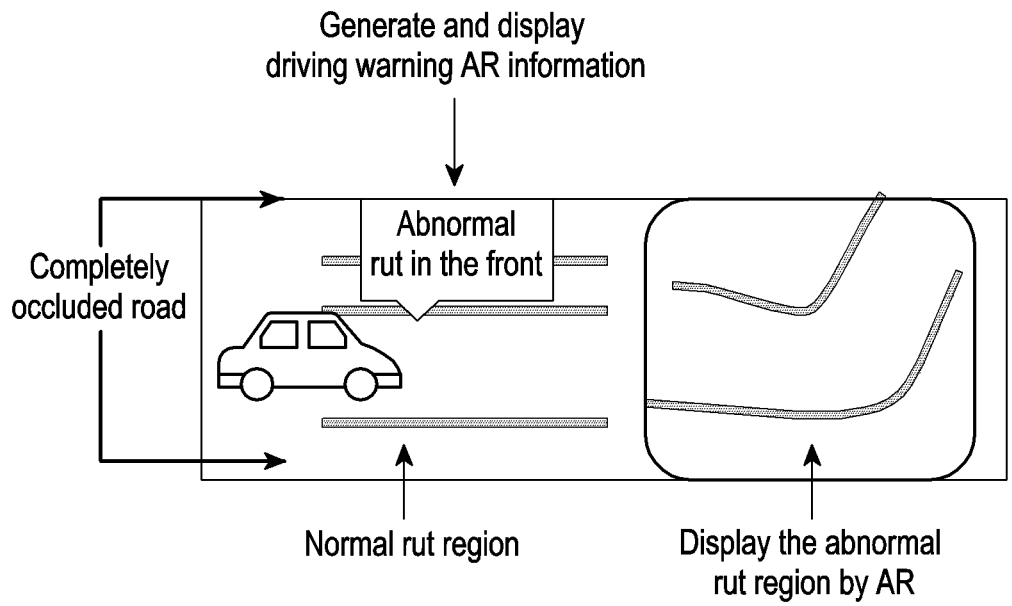
FIG. 6 is a schematic view of displaying ruts according to an embodiment of the present invention.
Figure 7:
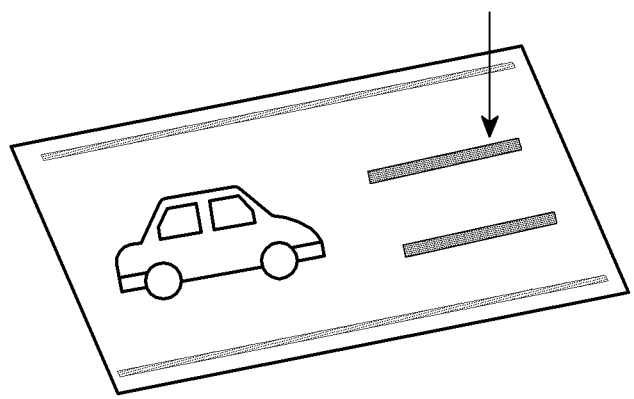
FIG. 7 is a schematic view of highlighting ruts when the ruts are not clear, according to an embodiment of the present invention.

In this embodiment of the present invention, the apparatus determines whether there is an abnormal rut. The abnormal rut can be determined based on whether the vector field constructed by rut edge lines being smooth and whether a general trend being consistent with the direction of the lane line and the road edge line; or, it can also be determined whether the vector field constructed by a rut edge line generated at a certain moment of time is quite different from the direction of the vector field constructed by other/all rut edges, and if so, it is determined that the generated rut edge line belongs to an abnormal rut edge line. Generally, the abnormal rut has an obvious direction collision with the lane line and the road edge and possibly has a braking mark. When there is an abnormal rut, the apparatus enhanced displays a road area where the abnormal rut is located in a warning manner, and generates driving warning AR information, as shown in FIG. 6. When there is no abnormal rut, the apparatus determines, according to the contrast of the color of the rut on the image or video and/or the clearness of the edge, whether the rut is obviously visible. If the rut is visible, the rut will not be enhanced displayed. For the road surface on which all ruts are not obviously visible, the apparatus selects the most obvious rut according to the driving route of this vehicle and then enhanced displays this rut, as shown in FIG. 7. Particularly, the apparatus detects, according to the driving state (e.g., speed or more) of this vehicle, a road environment (e.g., whether the road surface is slippery) and other factors, the road surface at an enough distance in the front in advance, and dynamically adjusts the pre-warning time so as to reserve enough response time for the driver.

AR objects used for enhanced displaying the road area where the abnormal rut is located and enhanced displaying an unobvious rut need to be aligned with a real road surface and real ruts, and the display mode is similar to the step S1301 in Embodiment 1 and will not be repeated here.

Figure 8:
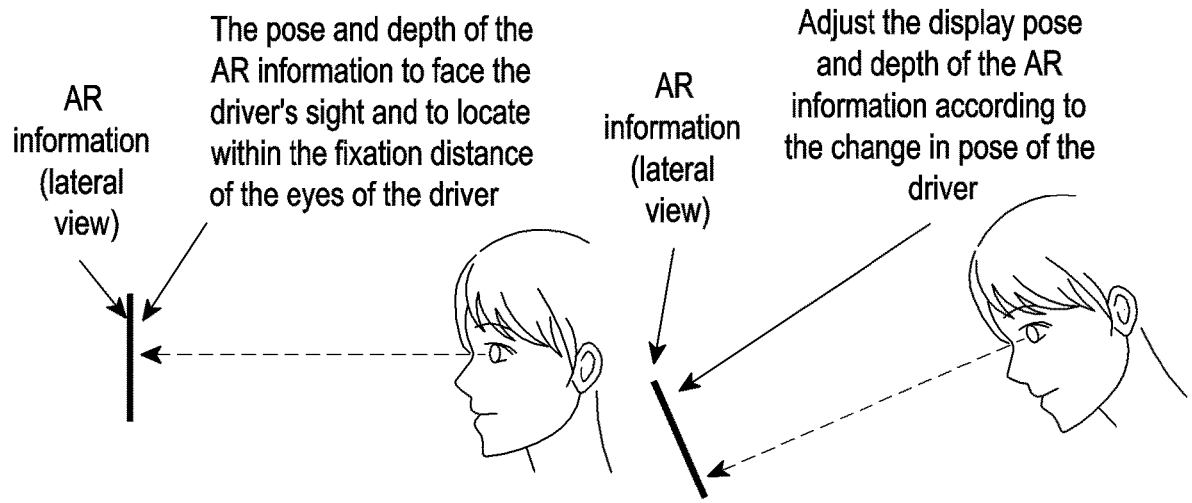
FIG. 8 is a schematic view of a relationship between the display of AR information and the driver's sight, according to the present invention.

In this embodiment of the present invention, AR information for warning an abnormal rut does not need to be aligned with real objects. When the display device is a head-mounted display device, the apparatus can directly strikingly present AR information at a salient position within the current field of view of the driver and determine a display mode according to the fixation distance of the driver. The AR information directly faces the driver's sight, and the fixation distance of the driver can be obtained by gaze tracking. When the display device is a vehicle-mounted display device, the apparatus can strikingly present AR information within an area of a display screen, and arrange, according to the driver's sight, the pose and depth of the AR information to directly face the driver's sight and to locate within the fixation distance of the eyes of the driver, as shown in FIG. 8. Meanwhile, the apparatus can attract the driver's attention by animation, sound or more, so that the latency is decreased.

Step S1404 (not shown): AR information corresponding to the generated target driving assistance information is displayed.

The step S1404 can be an implementation of displaying virtual 3D AR information corresponding to one or more pieces of target driving assistance information.

The step S1404 is similar to the step S1401 in Embodiment 1 and will not be repeated here.

Embodiment 5

Figure 9:
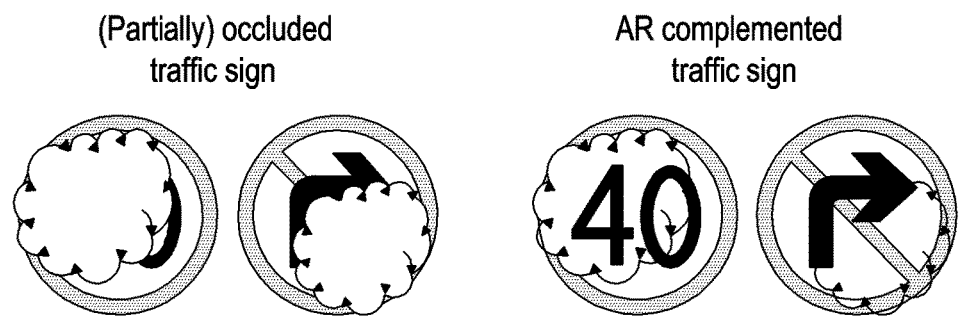
FIG. 9 is a schematic view of displaying a complete traffic sign/mandatory sign when the traffic sign/mandatory sign is covered partially or completely, according to an embodiment of the present invention.

This embodiment of the present invention provides a method for displaying driving assistance information. The method is applied to a road on which a traffic sign is covered or occluded partially or completely, and used for displaying prompt information of the occluded traffic sign and displaying corresponding AR driving assistance display information, as shown in FIG. 9. The occlusion for the traffic sign can comprise, but not be limited to, accumulated snow, mud, oil, presswork, leaves or more. The occlusion can be generally interpreted as damage, fall-off, paint fading, rain/fog/ haze, or incomplete visibility caused by the undesired state of sensors (for example, a lens is blotted).

The method in this embodiment of the present invention comprises the following steps.

Step S1105 (not shown): An apparatus determines whether to display traffic sign-related information.

The step S1105 can be an implementation of determining, by the apparatus, one or more pieces of target driving assistance information to be displayed.

In this embodiment of the present invention, the apparatus determines road information (which can comprise, but not be limited to, lane lines, road edge lines, road surface traffic and road conditions and other information indications) in the surrounding of this vehicle by image recognition. The apparatus can be always kept in a recognition state and adaptively activate a display function in the case of a road having a partially or completely occluded traffic sign and/or mandatory sign; or, the apparatus can activate a recognition function and/or a display function according to a user's instruction. The user's instruction can be borne by gestures, voice, physical buttons and identification biomarkers such as fingerprint.

Step S1205 (not shown): An apparatus determines whether to perform enhanced display.

The step S1205 can be an implementation of acquiring and processing information to generate target driving assistance information content.

In this embodiment of the present invention, the apparatus collects road images or videos by using one or more cameras and then detects traffic signs on two sides of the road and above the road by an image processing technology and a recognition technology. The apparatus determines, based on the analysis of the images or videos, whether the content on a traffic sign is clear and complete. Specifically, the apparatus can detect the position and bounding box (which is generally a rectangular box/circular box/triangular box or more) of a traffic sign on an image by an image detection technology. By deciding whether the image within the bounding box is clear and sharp and/or deciding a color distribution to further determine whether the content is clear. For an unclear traffic sign, the apparatus can acquire the complete information and icon format of the traffic sign by at least one of the following modes: the apparatus can search a database corresponding to the local map according to the position where this vehicle is located and then acquire the complete information and icon format of the traffic sign through the images collected by pattern matching and the database; the apparatus can perform image enhancement on the unclear image by an image algorithm (for example, for a traffic sign occluded by fog, image enhancement can be performed by an image defogging algorithm to obtain a relatively clear image) to obtain the complete information and icon format of the traffic sign; and the apparatus can acquire the complete information and icon format from the images of the traffic signs acquired from other angles; the apparatus can acquire the complete information and icon format by using information about other traffic signs and/or driving information. For example, according to the content "200 M FROM THE EXIT" of the previous traffic sign and the driving information that this vehicle has travelled 100 m, it can be inferred that the content of the current traffic sign is "100 M FROM THE EXIT".

Step S1305 (not shown): A display mode for the target driving assistance information content is determined.

The step S1305 can be an implementation of determining a display mode for one or more pieces of target driving assistance information.

The step S1305 is similar to the step S1301 in Embodiment 1 and will not be repeated here. Particularly, the generated AR traffic signs need to be aligned with real traffic signs. The apparatus acquires the position and pose of a real object relative to the display device by an image localization algorithm. Specifically, when a traffic sign in the surrounding of this vehicle is acquired by a single camera, since the traffic sign can be approximately considered as a plane, feature points can be extracted from an outline of the traffic sign, and a relationship in relative position and pose between the traffic sign and the camera is acquired by solving a homography matrix. More accurately, feature tracking can be performed on an image sequence by a visual odometry, wherein the features are acquired from a real object to be aligned such as the outline of the traffic sign, so that a relationship in relative position and pose between the real object and the camera is acquired. Particularly, the extraction and tracking of feature points can be assisted by the image recognition, so that a mismatch is eliminated and the speed is accelerated.

Step S1405 (not shown): AR information corresponding to the generated target driving assistance information is displayed.

The step S1405 can be an implementation of displaying virtual 3D AR information corresponding to one or more pieces of target driving assistance information.

The step S1405 is similar to the step S1401 in Embodiment 1 and will not be repeated here.

Embodiment 6

This embodiment of the present invention provides a method for displaying driving assistance information. The method is used for displaying prompt information of traffic signs within the already passed area and displaying corresponding AR driving assistance display information.

The method in this embodiment of the present invention comprises the following steps.

Step S1106 (not shown): An apparatus determines whether to display traffic sign-related information.

The step S1106 can be an implementation of determining, by the apparatus, one or more pieces of target driving assistance information to be displayed.

In this embodiment of the present invention, the apparatus activates or deactivates a display function according to a user's instruction. The user's instruction can be borne by gestures, voice, physical buttons and identification biomarkers such as fingerprint. The apparatus can also adaptively deactivate the display function according to residence time of the user's sight on the AR traffic sign. Or, a combination of the two modes can be used.

Step S1206 (not shown): The apparatus generates content to be displayed.

The step S1206 can be an implementation of acquiring and processing information to generate target driving assistance information content.

Figure 10:
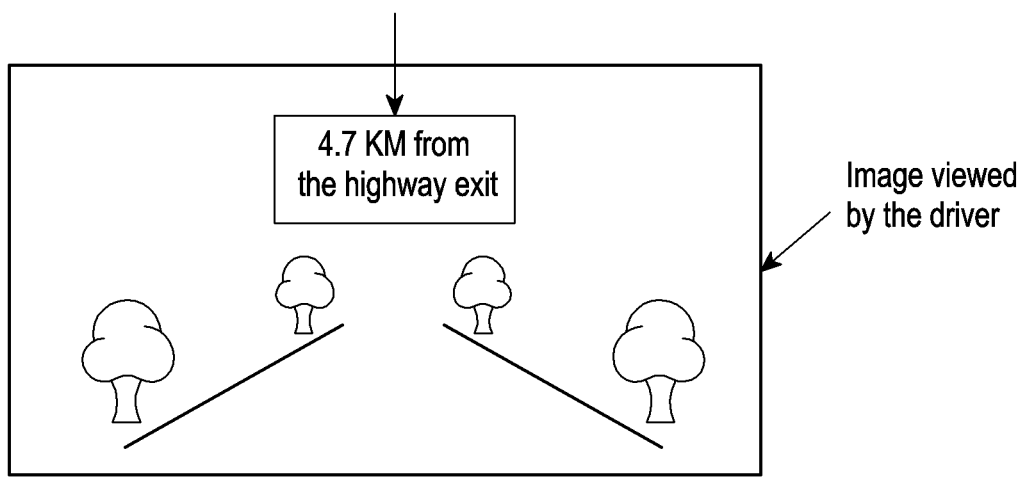
FIG. 10 is a schematic view of determining, according to historical records, a traffic sign and/or a mandatory sign corresponding to the current position, according to an embodiment of the present invention.

In this embodiment of the present invention, the apparatus searches traffic signs that this vehicle has passed by for a period of time in the past. The apparatus can search all traffic signs that this vehicle has passed by, or can search related traffic signs according to a keyword in the user's instruction. When there is a high-accuracy road map, the apparatus can search, according to the current location of this vehicle on the map, traffic signs within an area that this vehicle has passed by just now. When there is no map, the apparatus detects and recognizes, from the historical road images or videos collected by one or more cameras, and by an image processing technology and a detection and recognition technology, traffic signs on two sides of the road and above the road to acquire traffic signs fulfilling the searching requirements. The apparatus extracts, from the searched traffic signs, the complete information and icon format of a traffic sign. Particularly, the apparatus can adjust the specific content in the traffic sign according to the current location. For example, if the original content of the traffic sign is "5 KM FROM THE HIGHWAY EXIT", since this vehicle has travelled by 300 m relative to the traffic sign, the apparatus can change the content of the mandatory sign as "4.7 KM FROM THE HIGHWAY EXIT" to adapt to the current situation, as shown in FIG. 10. Particularly, the apparatus can search and/or generate one or more traffic signs.

Step S1306 (not shown): A display mode for the target driving assistance information content is determined.

The step S1306 can be an implementation of determining a display mode for one or more piece of target driving assistance information.

The step S1306 is similar to the step S1301 in Embodiment 1 and will not be repeated here. Particularly, when more than one traffic sign is searched, the apparatus can simultaneously display multiple traffic signs, or can successively display the multiple traffic signs. The apparatus preferably displays a corresponding AR traffic sign in form of a real traffic sign. Since the AR traffic signs do not need to be aligned with real objects, the apparatus preferably displays, according to the driver's fixation distance, an AR traffic sign at a position close to the sky to avoid interfering with the driver's observation of the real road surface.

Step S1406 (not shown): AR information corresponding to the generated target driving assistance information is displayed.

The step S1406 can be an implementation of displaying virtual 3D AR information corresponding to one or more pieces of target driving assistance information.

The step S1406 is similar to the step S1401 in Embodiment 1 and will not be repeated here.

Embodiment 7

This embodiment of the present invention provides a method for displaying driving assistance information. The method is used for displaying an extended area of side-view mirrors on two sides of this vehicle and displaying corresponding AR driving assistance display information.

The method in this embodiment of the present invention comprises the following steps.

Step S1107 (not shown): An apparatus determines whether to display information related to an extended area of a side-view mirror.

The step S1107 can be an implementation of determining, by the apparatus, one or more pieces of target driving assistance information to be displayed.

In this embodiment of the present invention, the apparatus activates or deactivates the display function according to a user's instruction. The user's instruction can be borne by gestures, voice, physical buttons and identification biomarkers such as fingerprint. The apparatus can also adaptively determine whether to activate or deactivate the display function by detecting whether attention of the driver is on the side-view mirror and/or whether a side-view mirror is located within the field of view of the driver. Or, a combination of the two modes can be used. When the used camera is an exterior view camera on a head-mounted display device, the detection mode can be as follows: detecting whether a side-view mirror is located within the field of view of the driver by detecting whether there is a side-view mirror in the image, so that the apparatus can acquire the current area of the driver's sight by gaze tracking and then determine whether the attention of the driver is located within the area of the side-view mirror. When the used camera is an interior view camera on this vehicle, the apparatus can determine whether a side-view mirror is located within the field of view of the driver by detecting the orientation of the driver's head and/or the orientation of the eyes and/or the direction of the sight, and determine the fixation area of the driver's sight.

Step S1207 (not shown): The apparatus generates content to be displayed.

The step S1207 can be an implementation of acquiring and processing information to generate target driving assistance information content.

Firstly, the apparatus estimates the relative position and pose of the driver's head/eyes/sight relative to a side-view mirror.

Specifically, when the used camera is an exterior view camera on a head-mounted display device, the relative position and pose of the exterior view camera and the driver's head is fixed, and the relationship in relative position, pose and size between the exterior view camera and the eyes can be calibrated in advance (the relationship needs to be recalibrated occasionally when in use; for example, the relationship in position, pose and size needs to be recalibrated after a user has adjusted the position of the head-mounted display device). Therefore, it is only required to acquire the relationship in relative position and pose between the side-view mirror and the exterior view camera. Specifically, the apparatus can segment a side-view mirror by an image recognition technology. Since the side-view mirror can be considered as a size-fixed plane, the relationship in relative position and pose between the side-view mirror and the camera is acquired by solving a homography matrix. The apparatus can also perform feature tracking on an image sequence of the side-view mirror by a visual odometry, wherein the features are collected from an edge outline of the side-view mirror, so that the smooth relationship in relative position and pose between the side-view mirror and the camera is acquired. The apparatus can also paste a location marker onto a screen of the side-view mirror, and the exterior view camera on the apparatus estimates the relationship in relative position, pose and size between the side-view mirror and the exterior view camera on this vehicle by the location marker, that is, (eyes←calibration→the display device←calibration→the exterior view camera on the apparatus←estimation→the side-view mirror).

When the used camera is an interior view camera on this vehicle, the relationship in relative position and pose between the interior view camera and the side-view mirror can be considered to be fixed and can be calibrated in advance (the relationship needs to be recalibrated occasionally when in use; for example, the relationship in position, pose and size needs to be recalibrated after the driver has adjusted the side-view mirror). Therefore, it is only required to acquire the relationship in relative position and pose between the interior view camera and the display device. Specifically, the apparatus can acquire, by the interior view camera (i.e., a camera for capturing the internal environment of this vehicle, e.g., the position of the driver) on this vehicle, a relationship in relative position, pose and size between the display device and the interior view camera on this vehicle. The acquisition mode can be based on a location marker on the display device, and/or based on a mode of extracting and tracking feature points based on fusion of images and/or multiple sensors and/or a detection mode, for example, an SLAM technology and a target object tracking technology. The relationship in relative position and pose between the eyes and the display device is relatively fixed and can be calibrated in advance (the relationship needs to be recalibrated occasionally when in use; for example, the relationship in position, pose and size needs to be recalibrated after the user has adjusted the position of the head-mounted display device), that is, (eyes←calibration→the display device←estimation→the interior view camera on this vehicle←calibration→the side-view mirror).

Figure 11:
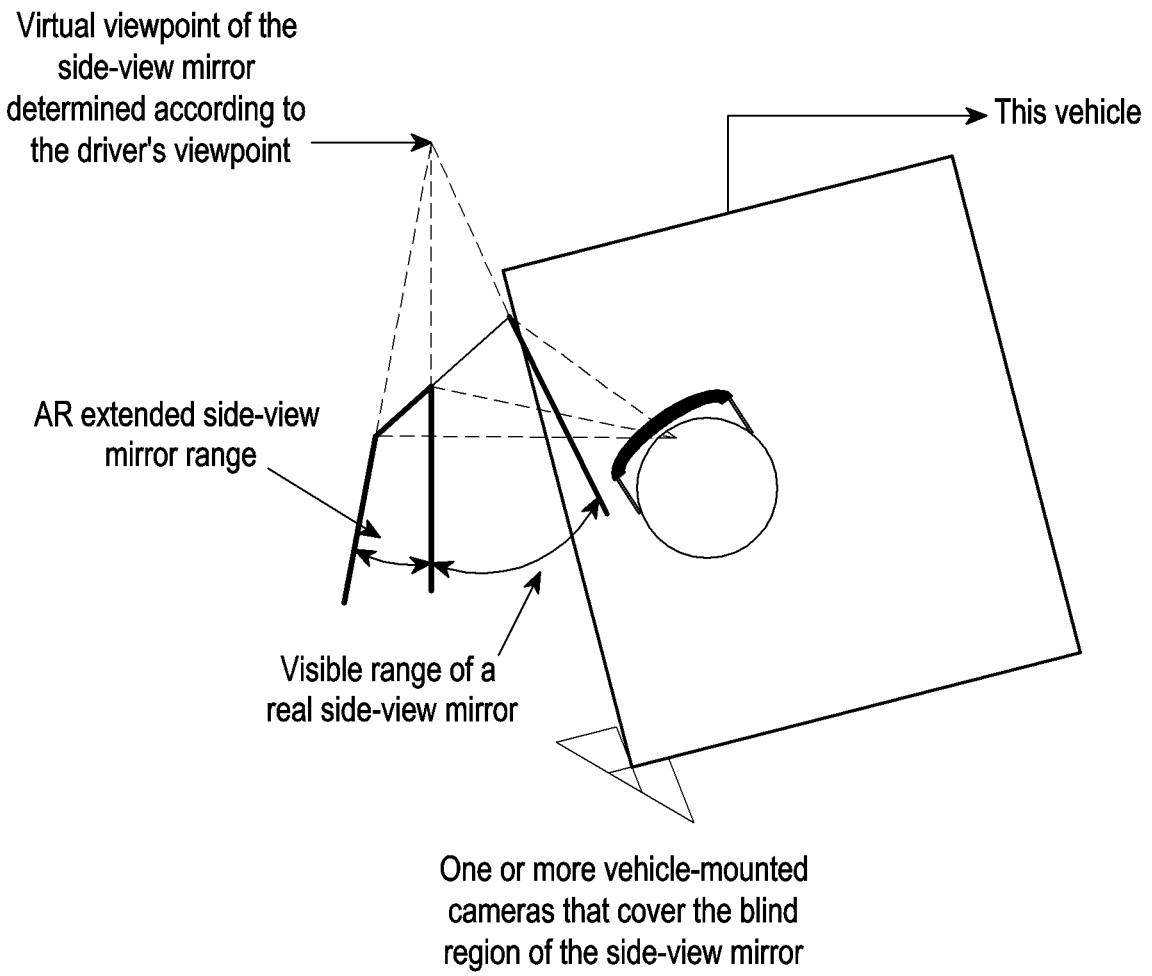
FIG. 11 is a schematic view of determining an extended area of a side-view mirror, according to an embodiment of the present invention.
Figure 12:
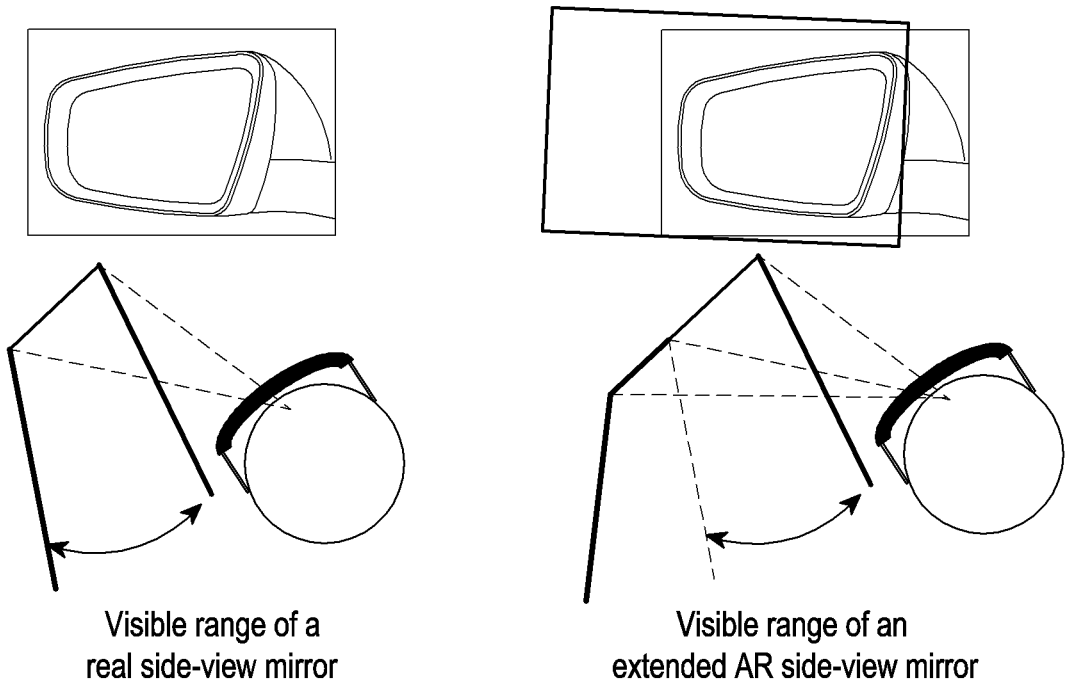
FIG. 12 is a schematic view of a visible area of a physical side-view mirror and an extended area of the side-view mirror, according to an embodiment of the present invention.

Secondly, after the apparatus estimates the relationship in relative position and pose between the driver's head/eyes and the side-view mirror, a virtual viewpoint of a mirror image of the side-view mirror is acquired according to mirror attributes of the side-view mirror, and the apparatus can collect, according to the virtual viewpoint and the extended area of the rear-view mirror, by using one or more cameras and/or a stereo camera and/or a depth camera on this vehicle, image information in the surrounding of the vehicle, wherein the collection range contains and is larger than the area covered by the side-view mirror, as shown in FIG. 11. The apparatus can acquire the content within the extended area of the rear-view mirror by the images acquired by other vehicle-mounted cameras. Since the relationship in relative position and pose between the exterior view camera on this vehicle and the side-view mirror is relatively fixed and can be calibrated in advance, the apparatus can generate, by using the images from the exterior view camera on this vehicle and by means of image based rendering, the content within the extended area of the side-view mirror. When the exterior view camera on this vehicle is a stereo camera and/or a depth camera, the apparatus can also generate, by using the images from the exterior camera and by means of depth image based rendering, the content within the extended area of the side-view mirror. FIG. 12 shows the range of a side-view mirror, including the extended area.

Step 1307 (not shown): A display mode for the extended area of the side-view mirror is determined.

The step S1307 can be an implementation of determining a display mode for one or more pieces of target driving assistance information.

The step S1307 is similar to the step S1301 in Embodiment 1 and will not be repeated here. Specifically:

In order to make the driver have a natural viewing experience, the apparatus can employ at least one of the following modes: the virtual 3D display information displayed within the extended area of the side-view mirror and a real object corresponding to the virtual 3D display information should be symmetrical relative to the extended area; the virtual 3D display information displayed within the extended area is a mirror image of the real object corresponding to the virtual 3D display information relative to the side-view mirror; the content displayed within the extended area and the content displayed in the side-view mirror are successive; and the content displayed within the extended area and the content displayed in the side-view mirror should have a certain overlap and/or transition.

Step S1407 (not shown): AR information corresponding to the generated target driving assistance information is displayed.

The step S1407 can be an implementation of displaying virtual 3D AR information corresponding to one or more pieces of target driving assistance information.

The step S1407 is similar to the step S1401 in Embodiment 1 and will not be repeated here.

Embodiment 8

This embodiment of the present invention provides a method for displaying driving assistance information. The method is used for displaying an extended area of an interior rear-view mirror inside this vehicle and displaying corresponding AR driving assistance display information.

The method in this embodiment of the present invention comprises the following steps.

Step S1108 (not shown): An apparatus determines whether to display information related to an extended area of an interior rear-view mirror.

The step S1108 can be an implementation of determining, by the apparatus, one or more pieces of target driving assistance information to be displayed.

In this embodiment of the present invention, the apparatus activates or deactivates the display function according to a user's instruction. The user's instruction can be borne by gestures, voice, physical buttons and identification biomarkers such as fingerprint. The apparatus can also adaptively determine whether to activate or deactivate the display function by detecting whether the attention of the driver is on the interior rear-view mirror. Or, a combination of the two modes can be used.

When the used camera is an exterior view camera on a head-mounted display device, the detection mode can be as follows: detecting whether the interior rear-view mirror is located within the field of view of the driver by detecting whether there is an interior rear-view mirror in the image, so that the apparatus can acquire the current area of the driver's sight by gaze tracking and then determine whether the attention of the driver is located within the area of the interior rear-view mirror. When the used camera is an interior view camera on this vehicle, the apparatus can determine whether the interior rear-view mirror is located within the field of view of the driver by detecting the orientation of the driver's head and/or the orientation of the eyes and/or the direction of the sight, and determine the fixation area of the driver's sight. The apparatus can also adaptively deactivate the display function according to the watching/residence time of the user's sight on the AR information.

Step S1208 (not shown): The apparatus generates content to be displayed.

The step S1208 can be an implementation of acquiring and processing information to generate target driving assistance information content.

Firstly, the apparatus estimates the relative position and pose of the driver's head/eyes/sight relative to the interior rear-view mirror.

When the display device is a head-mounted display device and the used camera is an exterior camera on the head-mounted display device, the relative position and pose of the exterior view camera and the driver's head is fixed, and the relationship in relative position, pose and size between the exterior view camera and the eyes can be calibrated in advance (the relationship needs to be recalibrated occasionally when in use; for example, the relationship in position, pose and size needs to be recalibrated after the user has adjusted the position of the head-mounted display device). Therefore, it is only required to acquire the relationship in relative position and pose between the interior rear-view mirror and the exterior view camera. Specifically, the apparatus can segment the interior rear-view mirror by an image recognition technology. Since the interior rear-view mirror can be considered as a size-fixed plane, the relationship in relative position and pose between the interior rear-view mirror and the camera is acquired by solving a homography matrix. The apparatus can also perform feature tracking on an image sequence of the interior rear-view mirror by a visual odometry, wherein the features are collected from an edge outline of the interior rear-view mirror, so that the smooth relationship in relative position and pose between the interior rear-view mirror and the camera is acquired. The apparatus can also paste a location marker on a screen of the interior rear-view mirror, and the exterior view camera on the apparatus estimates the relationship in relative position, pose and size between the interior rear-view mirror and the exterior view camera on this vehicle by using the location marker, that is, (eyes←calibration→the display device←calibration→the exterior view camera on the apparatus←estimation→the interior rear-view mirror).

When the display device is a head-mounted display device and the used camera is an interior view camera on this vehicle, the relationship in relative position and pose between the interior view camera and the interior rear-view mirror can be considered to be fixed and can be calibrated in advance (the relationship needs to be recalibrated occasionally when in use; for example, the relationship in position, pose and size needs to be recalibrated after the driver has adjusted the interior rear-view mirror). Therefore, it is only required to acquire the relationship in relative position and pose between the interior view camera and the display device. Specifically, the apparatus can acquire, by the interior view camera (i.e., a camera for capturing the internal environment of this vehicle, e.g., the position of the driver) on this vehicle, relationship in relative position, pose and size between the display device and the interior view camera on this vehicle. The acquisition mode can be based on a location marker on the display device, and/or based on a mode of extracting and tracking feature points based on fusion of images and/or multiple sensors and/or a detection mode or more, for example, an SLAM technology and a target tracking technology. The relationship in relative position and pose between the eyes and the display device is relatively fixed and can be calibrated in advance (the relationship needs to be recalibrated occasionally when in use; for example, the relationship in position, pose and size needs to be recalibrated after the user has adjusted the position of the head-mounted display device), that is, (eyes←calibration→the display device←estimation→the interior view camera on this vehicle←calibration→the interior rear-view mirror).

When the display device is a vehicle-mounted display device, the apparatus can acquire, by an interior view camera (i.e., a camera for capturing the internal environment of this vehicle, e.g., the position of the driver) on this vehicle, a relationship in relative position, pose and size between the eyes and the interior view camera on this vehicle. The acquisition mode can be based on a head-mounted location marker of the driver. The relationship in relative position, pose and size between the eyes and the head-mounted location marker can also be considered as being relatively fixed, and can be calibrated in advance (the relationship needs to be recalibrated occasionally when in use; for example, the relationship in position, pose and size needs to be recalibrated after the user has adjusted the position of the head-mounted location marker). The acquisition mode can also be an image based head/eyes/gaze localization and tracking technology, by which the apparatus localizes the head of the driver by an image or a video from the interior view camera on this vehicle and then estimates a relationship in relative position and pose between the eyes and the interior view camera based on the result of localization of the head. The acquisition mode can also be an image-based eye localization and tracking technology, by which the apparatus directly localizes a relationship in relative position and pose between the eyes and the interior view camera by using an image or a video from the interior view camera on this vehicle.

Figure 13:
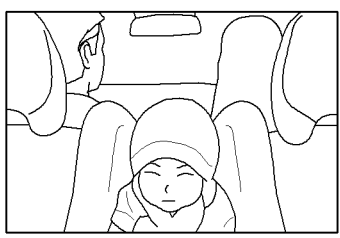
FIG. 13 is a schematic view of an extended area of an interior rear-view mirror, according to an embodiment of the present invention.
Figure 13:
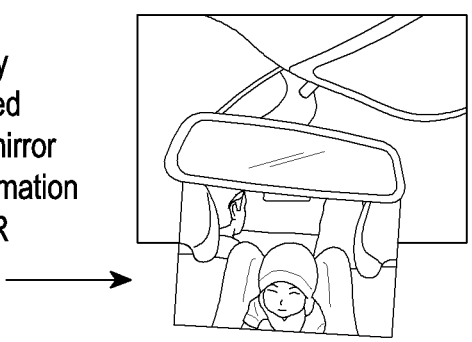

Secondary, when the apparatus estimates the relationship in relative position, pose and size between the driver's eyes and the interior rear-view mirror, the apparatus can, by an interior view camera inside this vehicle, capture an image or a video of a rear seat inside this vehicle and/or an external area of the tail, and zooms out or zoom in the content of the image or the video to serve as extended content, as shown in FIG. 13.

Step 1308 (not shown): A display mode for the extended area of the interior rear-view mirror is determined.

The step S1308 can be an implementation of determining a display mode for one or more pieces of target driving assistance information.

The step S1308 is similar to the step S1301 in Embodiment 1 and will not be repeated here. Particularly, the apparatus can enable the AR extended content to be adjusted within a certain angle range so that the AR extended content can face the direction of the driver's sight. When the display device is a head-mounted display device, considering the driver's habits, the apparatus preferably present AR information within or below the area of the interior rear-view mirror; and, when the display device is a vehicle-mounted display device, the apparatus preferably displays, according to the fixation distance of the driver, AR information at a position close to the sky to avoid interfering with the driver's observation of the real road surface.

Step S1408 (not shown): AR information corresponding to the generated target driving assistance information is displayed.

The step S1408 can be an implementation of displaying virtual 3D AR information corresponding to one or more pieces of target driving assistance information.

The step S1408 is similar to the step S1401 in Embodiment 1 and will not be repeated here.

Embodiment 9

This embodiment of the present invention provides a method for displaying driving assistance information. The method is used for displaying situations, including, but not limited to, a crossroad without traffic light, or a crossroad with the traffic light being damaged, or a crossroad with the traffic light being unnoticeable, or a crossroad with the traffic light being partially/completely occluded, and for displaying corresponding AR driving assistance display information. The above situations are collectively called a crossroad without traffic light hereinafter.

The method in this embodiment of the present invention comprises the following steps.

Step S1109 (not shown): An apparatus determines whether a crossroad without traffic light is approaching.

The step S1109 can be an implementation of determining, by the apparatus, one or more pieces of target driving assistance information to be displayed.

In this embodiment of the present invention, the apparatus inspects whether there is a traffic light at a next crossroad on a map by determining the location of this vehicle, and then adaptively activates the display function. The apparatus can also activate the recognition function and/or the display function according to a user's instruction. The user's instruction can be borne by gestures, voice, physical buttons and identification biomarkers such as fingerprint.

Step S1209 (not shown): The apparatus generates content to be displayed.

The step S1209 can be an implementation of acquiring and processing information to generate target driving assistance information content.

Figure 14:
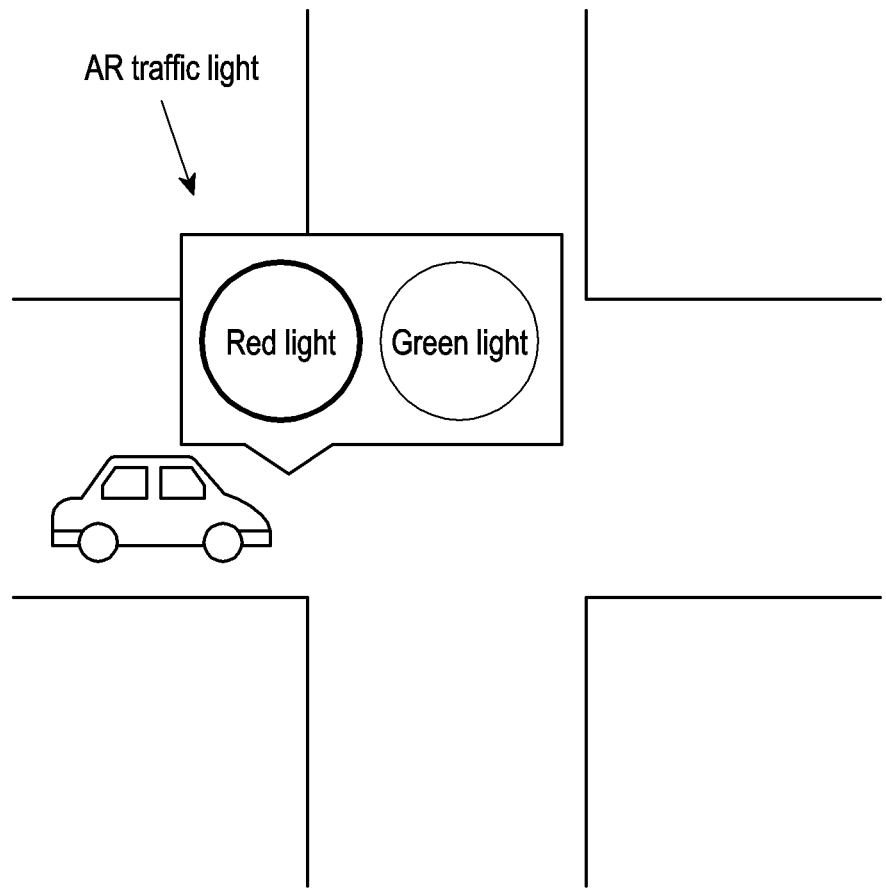
FIG. 14 is a schematic view of displaying a virtual traffic light, according to an embodiment of the present invention.

In this embodiment of the present invention, the apparatus monitors information about a crossroad by one or more vehicle-mounted cameras and then determines the arrival order of other vehicles at the crossroad by an image inspection technology and a recognition technology. The apparatus acquires, from the map, traffic regulations for this crossroad to generate a virtual AR traffic light for indicating the driving operation of the driver, as shown in FIG. 14. For example, if the traffic regulations for a crossroad indicate "stop for 3 seconds after arrival" and "first come, first served", the apparatus can monitor the stop order of vehicles at this crossroad by an image technology and then generate, in combination with the traffic regulations, a virtual red light that will turn green after 3 seconds.

For a crossroad with a traffic light, the apparatus can acquire, according to the driver's instruction and by at least one camera, a video of a real traffic light, and then generate an AR traffic light by copying the real traffic light.

Step S1309 (not shown): A display mode for the target driving assistance information content is determined.

The step S1309 can be an implementation of determining a display mode for one or more pieces of target driving assistance information.

The step 1309 is similar to the step S1306 in Embodiment 6 except that the AR traffic sign is replaced with an AR traffic light, and will not be repeated here.

Step S1409 (not shown): AR information corresponding to the generated target driving assistance information is displayed.

The step S1409 can be an implementation of displaying virtual 3D AR information corresponding to one or more pieces of target driving assistance information.

The step S1409 is similar to the step S1401 in Embodiment 1 and will not be repeated here.

Embodiment 10

This embodiment of the present invention provides a method for displaying driving assistance information. The method is used for displaying traffic policemen and displaying corresponding AR driving assistance display information.

The method in this embodiment of the present invention comprises the following steps.

Step S1110 (not shown): An apparatus determines whether there is a traffic policeman.

The step S1110 can be an implementation of determining, by the apparatus, one or more pieces of target driving assistance information to be displayed.

In this embodiment of the present invention, the apparatus collects the surrounding of this vehicle by one or more cameras, and then determines, by an image detection and recognition technology, whether there is a traffic policeman and/or whether there is a roadblock placed by a traffic policeman, and adaptively activates the display function. The apparatus can also activate the recognition function and/or the display function according to a user's instruction. A combination of the two modes can also be used. The user's instruction can be borne by gestures, voice, physical buttons and identification biomarkers such as fingerprint.

Step S1210 (not shown): The apparatus generates content to be displayed.

The step S1210 can be an implementation of acquiring and processing information to generate target driving assistance information content.

Figure 15:
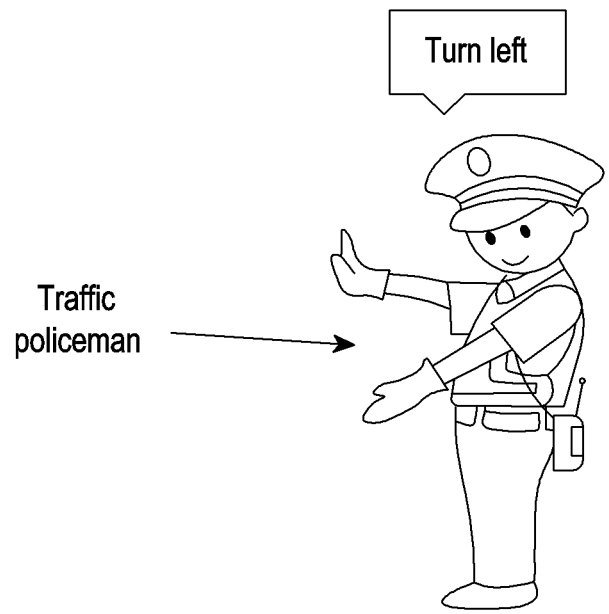
FIG. 15 is a schematic view of displaying corresponding AR information according to a traffic policeman's gesture, according to an embodiment of the present invention.

In this embodiment of the present invention, the apparatus detects, recognizes and tracks a traffic policeman's pose, gesture, baton or other indication tools by using one or more cameras. A corresponding AR message is generated according to the local traffic policeman gesture rules. For example, if the traffic policeman's gesture indicates TURN LEFT, an AR message TURN LEFT is generated, as shown in FIG. 15.

Step S1310 (not shown): A display mode for the target driving assistance information content is determined.

The step S1310 can be an implementation of determining a display mode for one or more pieces of target driving assistance information.

The step S1310 is similar to the step S1301 in Embodiment 1 and will not be repeated here.

In this embodiment of the present invention, when the display device is a single head-mounted display device, the apparatus can display the generated AR message besides the corresponding traffic policeman. The AR message can face the driver's sight, or can be kept consistent with the orientation of the traffic policeman's body.

In this embodiment of the present invention, when the display device is a single vehicle-mounted display device, the apparatus can display the generated AR message facing the driver's sight.

In this embodiment of the present invention, when there are multiple traffic policemen, the apparatus can simultaneously display multiple AR messages besides the corresponding traffic policemen, or can preferentially display an AR message related to the traffic policeman currently facing this vehicle.

Step S1410 (not shown): AR information corresponding to the generated target driving assistance information is displayed.

The step S1410 can be an implementation of displaying virtual 3D AR information corresponding to one or more pieces of target driving assistance information.

The step S1410 is similar to the step S1401 in Embodiment 1 and will not be repeated here.

Embodiment 11

This embodiment of the present invention provides a method for displaying driving assistance information. The method is used for displaying the positions, functions and operating modes of buttons on a dashboard, and displaying corresponding AR driving assistance display information.

The method in this embodiment of the present invention comprises the following steps.

Step S1111 (not shown): An apparatus determines whether to display a dashboard.

The step S1111 can be an implementation of determining, by the apparatus, one or more pieces of target driving assistance information to be displayed.

In this embodiment of the present invention, the apparatus determines whether a driver needs to perform a certain operation by determining the surrounding of this vehicle and/or the environment inside this vehicle. For example, if there is fog on the windshield, the apparatus can determine that the driver needs to use a wiper, and then adaptively activate the display function; or, the apparatus can activate the recognition function and/or the display function according to a user's instruction; or, a combination of the two modes can be used. The user's instruction can be borne by gestures, voice, physical buttons and identification biomarkers such as fingerprint.

Step S1211 (not shown): The apparatus generates content to be displayed.

The step S1211 can be an implementation of acquiring and processing information to generate target driving assistance information content.

Figure 16:
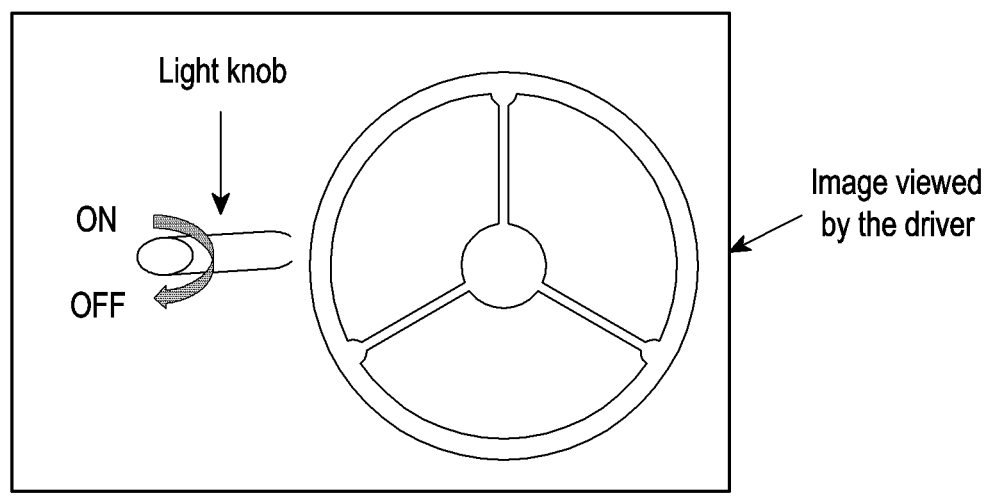
FIG. 16 is a schematic view of a display mode for AR information of buttons on a dashboard, according to an embodiment of the present invention.

Similar to the step S1208 in Embodiment 8, the apparatus determines whether a button to be operated is within the field of view of the driver. When the button to be operated is within the field of view of the driver, the apparatus highlights this button by highlighting the area of the button, indicating by an arrow, or encircling, and generates a functional name of the button and/or an operation instruction. For example, the name of the headlight is marked around a headlight knob, and/or the direction of turning on the light and the direction of turning off the light are indicated by arrows, as shown in FIG. 16.

Step S1311 (not shown): A display mode for the target driving assistance information content is determined.

The step S1311 can be an implementation of determining a display mode for one or more pieces of target driving assistance information.

Particularly, this embodiment can only be cooperatively used with a head-mounted display device.

When the display device is a single head-mounted display device, the apparatus can display the generated AR message besides the button. The AR message can face the driver's sight, or can be kept consistent with the orientation of the button. The operation instruction is kept consistent with the operation action of a real button.

Step S1411 (not shown): AR information corresponding to the generated target driving assistance information is displayed.

The step S1411 can be an implementation of displaying virtual 3D AR information corresponding to one or more pieces of target driving assistance information.

The step S1411 is similar to the step S1401 in Embodiment 1 and will not be repeated here.

Embodiment 12

Figure 17:
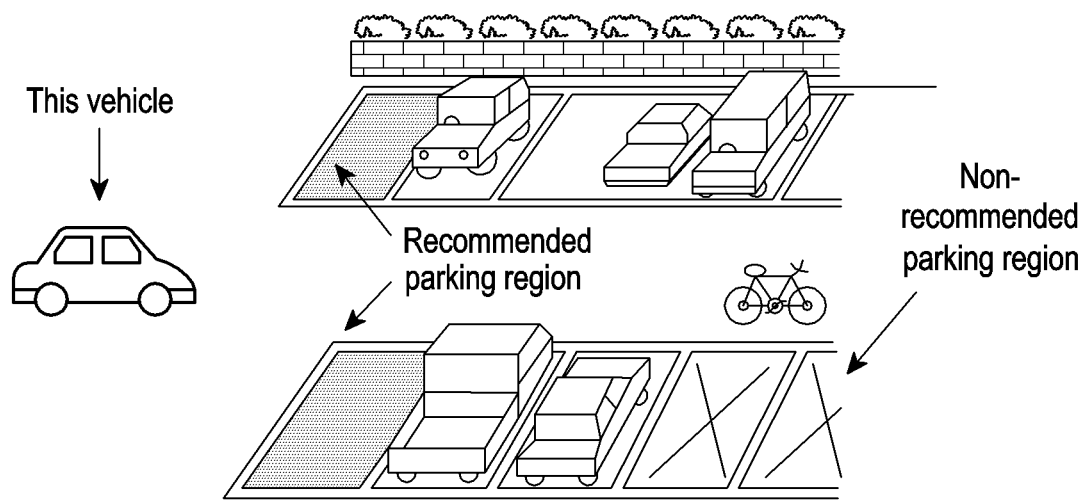
FIG. 17 is a schematic view of displaying an area appropriate for parking and an area not appropriate for parking and displaying corresponding AR driving assistance display information, according to an embodiment of the present invention.

This embodiment of the present invention provides a method for displaying driving assistance information. The method is used for displaying at least one of areas where parking is allowed and it is appropriate for parking, areas where parking is allowed but it is not appropriate for parking, and areas where parking is not allowed, and displaying corresponding AR driving assistance display information, as shown in FIG. 17.

The method in this embodiment of the present invention comprises the following steps.

Step S1112 (not shown): An apparatus determines whether to display at least one of areas where parking is allowed and it is appropriate for parking, areas where parking is allowed but it is not appropriate for parking, and areas where parking is not allowed.

The step S1112 can be an implementation of determining, by the apparatus, one or more pieces of target driving assistance information to be displayed.

In this embodiment of the present invention, the apparatus determines whether the driver searches for a space for parking by determining the surrounding of this vehicle and/or the environment inside this vehicle and/or the driver's intention. For example, when the driver arrives at a specified destination or drives into a parking lot, the apparatus adaptively activates the display function; or, the apparatus can activate the recognition function and/or the display function according to a user's instruction; or, a combination of the two modes can be used. The user's instruction can be borne by gestures, voice, physical buttons and identification biomarkers such as fingerprint.

Step S1212 (not shown): The apparatus generates content to be displayed.

The step S1212 can be an implementation of acquiring and processing information to generate target driving assistance information content.

In this embodiment of the present invention, the apparatus detects a surrounding area of this vehicle by one or more vehicle-mounted cameras, then detects and recognizes whether there is a NO PARKING sign or like, and analyzes areas where parking is allowed and/or areas where parking is not allowed. By the image processing technology and in combination with the size of this vehicle, the apparatus determines whether the areas where parking is allowed are flat, whether the space is sufficient, whether there is a ponding, mud or other factors disadvantageous for parking, then selects and sorts the areas where parking is allowed, and displays areas where parking is allowed and it is appropriate for parking and/or areas where parking is allowed but it is not appropriate for parking.

Step S1312 (not shown): A display mode for the target driving assistance information content is determined.

The step S1312 can be an implementation of determining a display mode for one or more pieces of target driving assistance information.

The step S1312 is similar to the step S1301 in Embodiment 1 and will not be repeated here. Particularly, the apparatus presents, in different forms, areas where parking is allowed and it is appropriate for parking, areas where parking is allowed but it is not appropriate for parking, and areas where parking is not allowed.

Step S1412 (not shown): AR information corresponding to the generated target driving assistance information is displayed.

The step S1412 can be an implementation of displaying virtual 3D AR information corresponding to one or more pieces of target driving assistance information.

The step S1412 is similar to the step S1401 in Embodiment 1 and will not be repeated here.

Particularly, in all embodiments, the adaptive determination of the apparatus is shown in the following three aspects: the display starting time of one or more pieces of AR information, and/or the display ending time of one or more pieces of AR information, and/or the display duration of one or more pieces of AR information. When the apparatus adaptively determines the time and/or the duration, the apparatus comprehensively considers at least one of the state of the vehicle, the road conditions and the system latency of the apparatus, to realize preferable display starting time and/or display ending time and the preferable display duration, so as to avoid display problems (including, but not limited to, too early, too late, too long or too short) from misleading and disturbing the driver.

Examples will be given below. For an AR warning message for warning an insufficient safety distance, the apparatus can start the display when the distance from this vehicle to a surrounding vehicle is less than a safety distance, and stop the display when the distance from this vehicle to the surrounding vehicle is greater than the safety distance. However, the safety distance varies according to different conditions. When the vehicle runs on a snowy road surface, the safety distance of this vehicle to a surrounding vehicle should be greater than the safety distance when the vehicle runs on an ordinary road surface. Moreover, the safety distance is related to the driving speed of this vehicle and the driving speed of the surrounding vehicle. A higher speed requires a longer safety distance. In other words, the safety distance should be adaptively determined according to the specific conditions. Therefore, based on the state (speed or more) of vehicle, the road conditions (snowy road surface or more) and the system latency of the apparatus, the apparatus can adaptively estimate the safety distance in the current conditions. Thus, correspondingly, the display starting time, display ending time and display duration of the AR warning message for warning an insufficient safety distance, by using the apparatus, will be adaptively adjusted according to the safety distance, not fixed.

Particularly, in all embodiments, the apparatus adaptively decreases two latencies, i.e., attention latency and display latency. The attention latency is defined as time delay from the time when the apparatus displays the AR information to the time when the driver notices the AR information; and the display latency is defined as time taken by the apparatus to generate, render and display the AR information.

In order to decrease the attention latency, the apparatus can employ at least one of the following five modes: 1) high-priority AR information is adaptively displayed at a salient position within the current field of view of the driver, and a display mode is determined according to the current fixation distance of the driver; 2) the display form for the AR information is adaptively adjusted according to the real scene environment, and the contrast of the AR information and the real scene environment is increased to highlight the AR information; 3) with regard to high-priority AR information, in order to highlight the high-priority AR information, low-priority AR information in the surrounding of the high-priority AR information is stopped and/or paused displaying; 4) with regard to high-priority AR information, the apparatus adaptively displays the high-priority AR information at a salient position within the field of view of the driver, and adaptively adjusts the display position of the high-priority AR information when the field of view of the driver changes (when the driver turns his/her head, turns his/her eyes, etc.), so that the high-priority AR information is kept at the salient position within the field of view of the driver; and, 5) the apparatus also uses at least one of sound, animation, shaking, light flickering or other methods to attract the driver's attention.

For example, when the driver looks at the left side of this vehicle and an explosion occurs on the right side of this vehicle, the apparatus immediately displays the generated AR alarm within the current field of view of the driver, i.e., on the left side of this vehicle.

Figure 18:
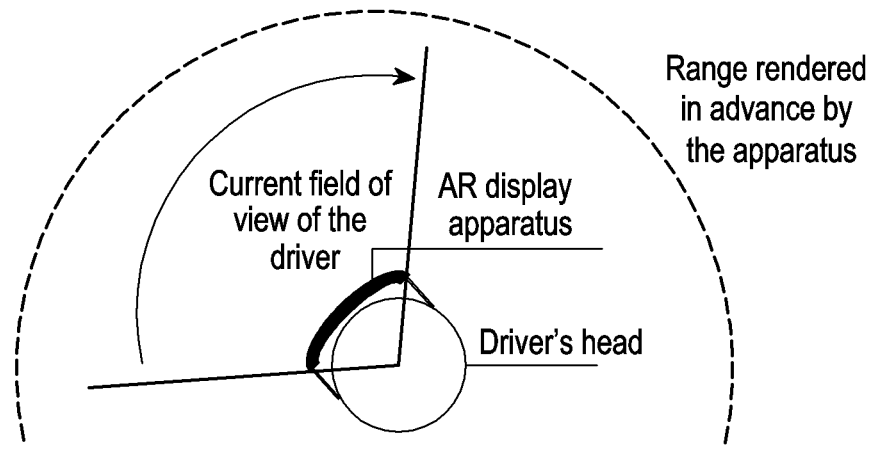
FIG. 18 is a schematic view of preparing and rendering AR information within a large range by an apparatus in advance to reduce the delay, according to an embodiment of the present invention.
Figure 19:
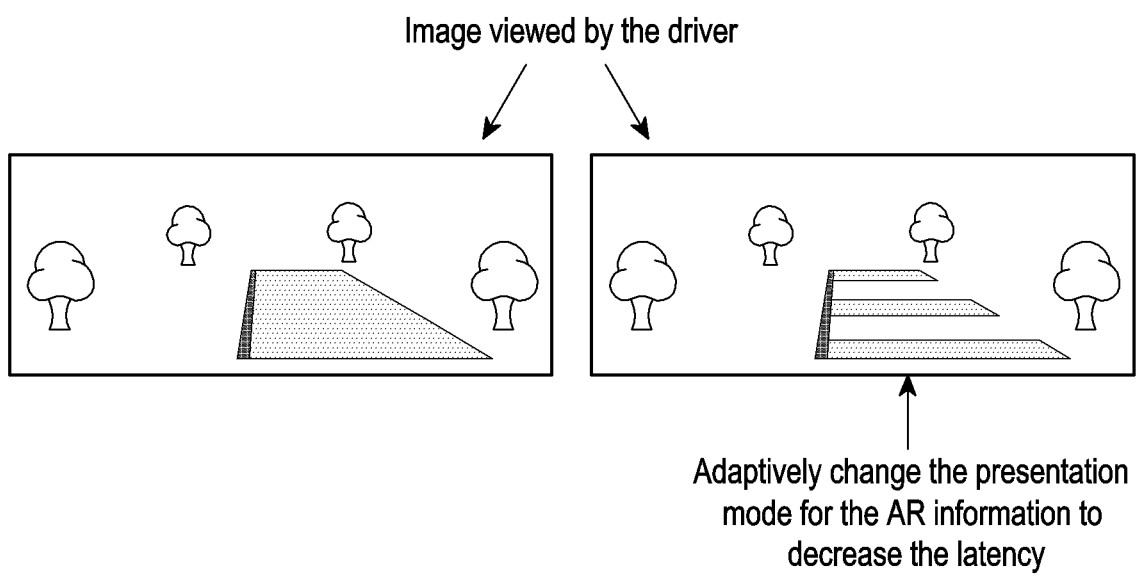
FIG. 19 is a schematic view of different display modes of a driving area due to different vehicle speeds, according to an embodiment of the present invention.

In order to decrease the display latency, the apparatus can employ at least one of the following modes: 1) data to be displayed is prepared in advance: the apparatus collects information about this vehicle and information within a large surrounding range to generate corresponding AR information, and roughly determines the display mode for each piece of AR information; however, the apparatus can only adaptively and selectively display AR information within the current field of view of the driver; if allowed by the calculation capability, the apparatus can render the AR information in advance; when the AR information enters the field of view of the driver, the apparatus can directly acquire the AR information model rendered in advance, then adjust the AR information according to the current condition, and then display the adjusted AR information, as shown in FIG. 18; and, 2) the presentation mode for the AR information to be displayed is changed: considering that the acceptable degree of latency is related to the current condition (for example, when the speed is 10 km/h, latency of 5 ms is possible to be acceptable; however, when the speed is up to 50 km/h, latency of 3 ms is possible to be already unacceptable), the apparatus can adaptively estimate the acceptable degree of latency according to the current condition and then adaptively change the presentation mode for the AR content. For example, as shown in FIG. 19, when the speed of this vehicle is low, the apparatus can completely display the driving area; however, when the speed of this vehicle rises, in order to decrease the latency, the apparatus can adaptively change the presentation mode for the driving area into a stripe pattern, i.e., decreasing the latency by reducing the amount of the data to be displayed.

Figure 20:
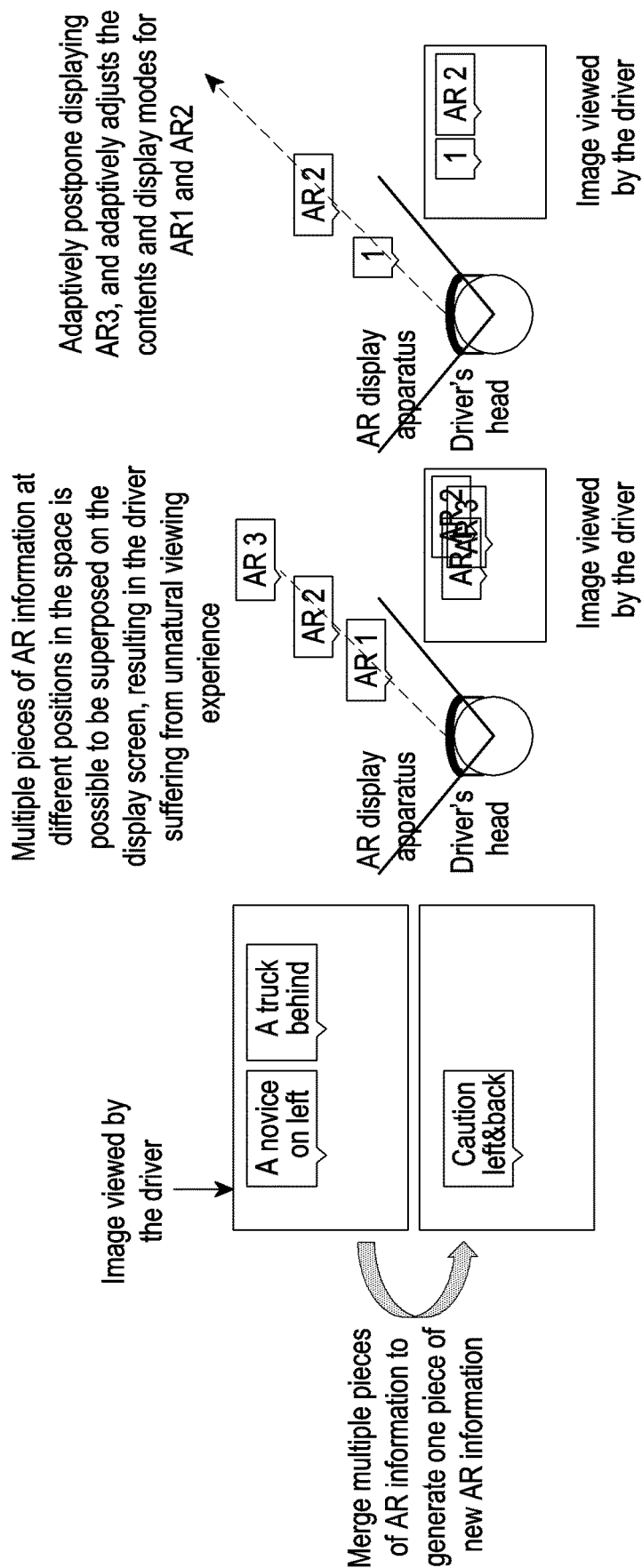
FIG. 20 is a schematic view of a display mode for multiple pieces of AR information when there are multiple pieces of AR information to be displayed, according to an embodiment of the present invention.

Particularly, as shown in FIG. 20, when there are multiple pieces of AR information to be displayed and if the apparatus adaptively selects an optimal display mode for each piece of AR information only by separately considering each piece of AR information, during the simultaneous display of the multiple pieces of AR information to the driver, the driver is possible to feel the AR information unclear due to an occlusion relationship between the multiple pieces of AR information, so that the driver gets puzzled.

Therefore, when multiple pieces of AR information having an occlusion relationship therebetween are to be displayed simultaneously, the apparatus can employ at least one of the following modes: 1) with regard to the multiple pieces of AR information which have to be displayed simultaneously, cannot be merged and/or integrated and should really have an occlusion relationship, the apparatus does not display an occluded portion of the occluded AR information adaptively according to the current position relationship so as to avoid interfering with the foreground AR information; 2) with regard to multiple pieces of AR information that can be merged and/or integrated, the apparatus adaptively merges and/or integrate the multiple pieces of AR information into one or more pieces of information; for example, four pieces of AR information can be simplified into two pieces of AR information; when the apparatus merges and/or integrates multiple pieces of AR information, simple merging of a same kind of information can be employed, or higher-level generation of new AR information according to the information meaning can be employed; as shown in FIG. 20, the apparatus can generate a simpler piece of new AR information "Caution left & back" from two pieces of AR information (i.e., "A novice on left" and "A truck behind"); 3) with regard to the AR information which can be delayed to be displayed, the apparatus can postpone displaying the AR information; for example, a piece of non-emergency AR information at a far distance can be postponed to be displayed after this vehicle arrivals at a closer distance, so as to avoid interfering with the display of AR information at a relatively close distance; similarly, the apparatus can delay, pause, stop or even give up the display of unimportant AR information to reduce/eliminate the occlusion; and, 4) as shown in FIG. 20, the apparatus can change the display position, the detailedness of contents and the presentation mode for one or more pieces of AR information, so as to weaken and even eliminate the occlusion relationship between the multiple pieces of AR information.

Figure 21:
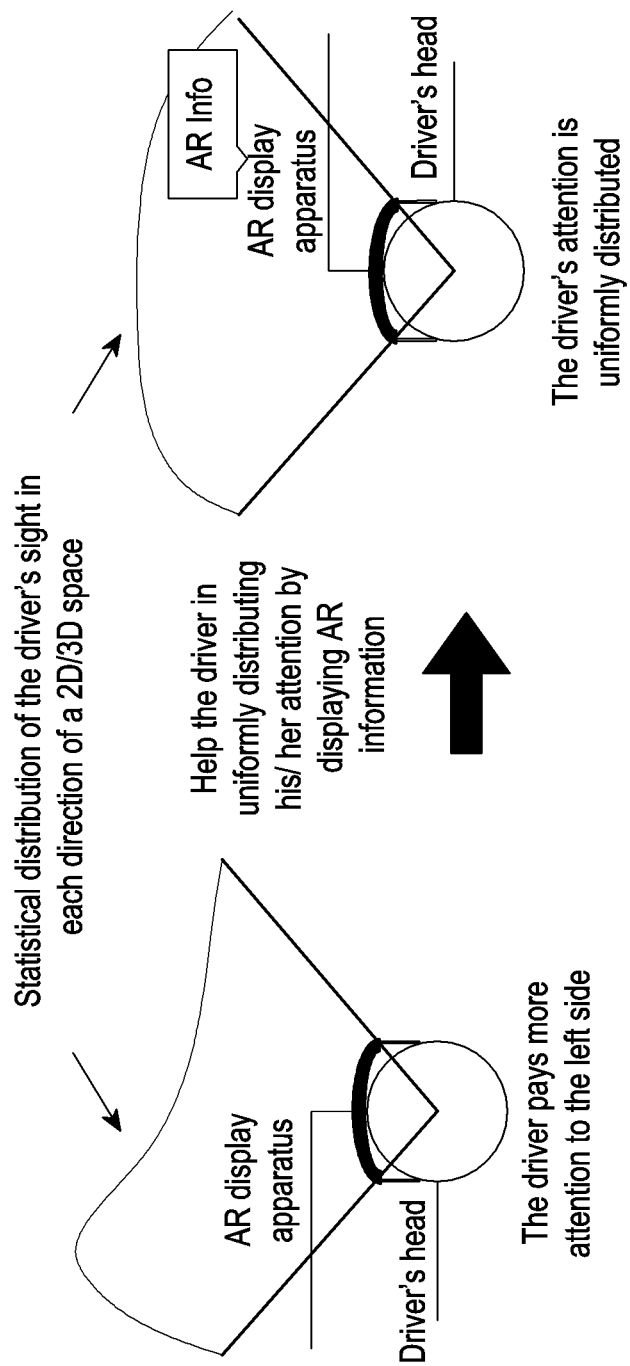
FIG. 21 is a schematic view of displaying, by the apparatus, AR information on the right side when the driver's sight statistics indicate that the driver pays more attention to the left side, according to an embodiment of the present invention.

Particularly, during the determination of the display position of the AR information, the apparatus considers at least one of the following situations: 1) the apparatus displays the AR information at a physically correct position, that is, the AR information is aligned with a corresponding object in a real space; 2) the apparatus displays the AR information within an area having no interference with the driving of the driver, for example, an area in the sky; 3) the apparatus displays the important AR information at a salient position of the current field of view of the driver; 4) the apparatus displays the AR information on one side where the field of view of the driver is relatively open; for example, when the driver's seat is on the left side, the driver's field of view on the right side is relatively open; and, when the driver's seat is on the right side, the driver's field of view on the left side is relatively open; and, 5) the apparatus displays the AR information within an area to which insufficient attention is paid by the driver. During the driving, the driver needs to fully observe all directions in order to ensure the safety. Therefore, the apparatus makes statistics on the residence time of the driver's sight in each direction. If it is found that the driver pays insufficient attention to a certain area or multiple areas, the AR information is saliently displayed within such areas in order to attract the driver's attention and help the driver in balancing the attention. The mode for attracting the driver's attention can work well with voice/sound, animation, light or more. As shown in FIG. 21, when the statistical result of the driver's sight indicates that the driver pays more attention to the left side, the apparatus can display the AR information on the right side to attract the driver's attention to the right side, so as to help the driver in balancing the attention.

Figure 22:
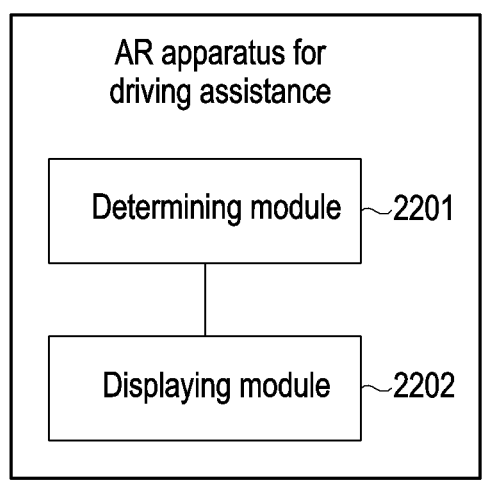
FIG. 22 is a schematic structure diagram of an AR apparatus for driving assistance, according to an embodiment of the present invention.

An embodiment of the present invention provides an Augmented Reality (AR) apparatus for driving assistance, as shown in FIG. 22, comprising: a determining module 2201 and a displaying module 2202.

The determining module 2201 is configured to determine, based on information acquired during the driving process, driving assistance information.

The displaying module 2202 is configured to display virtual 3D display information corresponding to the driving assistance information determined by the determining module 2201.

This embodiment of the present invention provides an AR apparatus for driving assistance. Compared with the prior art, in this embodiment of the present invention, driving assistance information is determined based on information acquired during the driving process, and virtual 3D display information corresponding to the driving assistance information is displayed. That is, driving assistance information during the driving process is determined by the information acquired during the vehicle travelling process, and virtual 3D display information corresponding to the driving assistance information during the driving process is presented to a driver in a visual and/or auditory manner so as to inform or warn the driver. Accordingly, the application of the AR technology in the vehicle travelling process can assist a driver in better mastering driving information during the vehicle travelling process, and the user experience can be thus improved.

The AR apparatus for driving assistance in this embodiment of the present invention is applied to the embodiments of the method and will not be repeated here.

It should be understood by those skilled in the art that the present invention involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present invention may be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. An Augmented Reality (AR) method for driving assistance, the method comprising:
   determining, using a processor, based on information acquired during a driving process, driving assistance information;
   displaying, using an AR display, virtual three-dimensional (3D) display information corresponding to the driving assistance information; and
   in response to detecting abnormal rut information, displaying virtual 3D display information corresponding to an abnormal rut area having the abnormal rut information,
   wherein displaying the virtual 3D display information corresponding to the driving assistance information comprises, in response to a display latency of the virtual 3D display information exceeding an acceptable display latency for a corresponding speed of the driving process, changing at least a part of the displayed virtual 3D display information into a stripe pattern.

2. The method according to claim 1, wherein,
   determining, based on information acquired during the driving process, driving assistance information comprises: determining, based on information about a sensible area acquired during the driving process, occluded driving assistance information; and displaying virtual 3D display information corresponding to the driving assistance information comprises: displaying virtual 3D display information corresponding to the occluded driving assistance information.

3. The method according to claim 2, wherein, in response to the occluded driving assistance information comprising road surface information or non-road surface traffic sign information, displaying virtual 3D display information corresponding to the occluded driving assistance information comprises:
displaying the virtual 3D display information corresponding to the occluded driving assistance information at a position of the occluded driving assistance information.

4. The method according to claim 3, wherein, determining, based on information about a sensible area acquired during the driving process, occluded driving assistance information comprises at least one of:
in response to the occluded driving assistance information being occluded partially, determining the occluded driving assistance information according to a sensible portion of the driving assistance information;
determining, based on a current position of a current vehicle and information about a reference in a sensible area during the current driving, the occluded driving assistance information;
determining, based on multimedia information of occluded driving assistance information acquired from an angle outside a driver's field of view, the occluded driving assistance information;
enhancing or restoring the multimedia information based on multimedia information of occluded driving assistance information acquired within a sensible area during the driving process, and determining the occluded driving assistance information;
in response to the occluded driving assistance information comprising road surface information, determining the occluded driving assistance information according to a map of a current road by aligning the current road with the map; or
determining currently occluded driving assistance information according to other driving assistance information.

5. The method according to claim 4,
wherein, after determining, based on information about a sensible area acquired during the driving process, occluded driving assistance information, further comprising:
correcting the determined occluded driving assistance information; and
displaying virtual 3D display information corresponding to the occluded driving assistance information comprises: displaying virtual 3D display information corresponding to the corrected driving assistance information at a corrected position, and
wherein, correcting the determined occluded driving assistance information comprises at least one of:
in response to the occluded driving assistance information comprising lane-related information, correcting the position of the occluded driving assistance information based on driving trajectory or road surface rut information of other vehicles within a preset range from the current vehicle, or
in response to the occluded driving assistance information comprising road surface information, correcting the position of the occluded driving assistance information according to a map of the current road by aligning the current road with the map.

6. The method according to claim 2, wherein, in response to the occluded driving assistance information comprising lane-related information, a displayed lane width is less than an actual lane width.

7. The method according to claim 2,
wherein, in response to the occluded driving assistance information comprising blind area information, displaying virtual 3D display information corresponding to the occluded driving assistance information comprises:
displaying, within an extended area of a rear-view mirror, virtual 3D display information corresponding to the blind area information, and
wherein, in response to the rear-view mirror being a side-view mirror, the virtual 3D display information displayed within the extended area is generated from a real object corresponding to the virtual 3D display information according to mirror surface attributes of the side-view mirror and a driver's viewpoint.

8. The method according to claim 1, wherein,
determining, based on information acquired during the driving process, driving assistance information comprises: acquiring a traffic regulation or a traffic policeman's action information for a current road section, and transforming a presentation mode for the acquired traffic regulation or traffic policeman's action information of the current road section; and
displaying virtual 3D display information corresponding to the driving assistance information comprises: displaying virtual 3D display information corresponding to the transformed traffic regulation or traffic policeman's action information for the current road section.

9. The method according to claim 1, wherein, displaying virtual 3D display information corresponding to the driving assistance information comprises at least one of:
in response to there being traffic signs within a road area that a current vehicle has passed by to be displayed, displaying virtual 3D display information corresponding to acquired traffic signs within the road area that the current vehicle has passed by;
in response to sensing that there is a traffic sign or a traffic light at a crossroad where the current vehicle is located and the traffic sign or the traffic light fulfills a predetermined display condition, displaying virtual 3D display information corresponding to the traffic sign or the traffic light at the crossroad;
in response to there being information about buttons in a dashboard to be displayed, displaying virtual 3D display information corresponding to at least one of: location information of the buttons, function name information of the buttons, operation instruction information of the buttons, or the buttons; or
in response to there being parking area information to be displayed, displaying virtual 3D display information corresponding to at least one of areas where parking is allowed and parking is appropriate, areas where parking is allowed but parking is not appropriate, or areas where parking is not allowed.

10. The method according to claim 9, wherein, determining, based on information acquired during the driving process, driving assistance information comprises at least one of:
determining whether road surface rut information has the abnormal rut information or not, and based on the determination that abnormal rut information is present, determining there is the abnormal rut area;

in response there being traffic signs within a road area that the current vehicle has passed by to be displayed, determining, from acquired multimedia information or a traffic signal database, traffic signs within the road area that the current vehicle has passed by; or in response to there being parking area information to be displayed, according to at least one of presence of a "NO PARKING" sign or like in a surrounding of the current vehicle, a size of the current vehicle, or a current road condition, determining at least one of areas where parking is allowed and parking is appropriate, areas where parking is allowed but parking is not appropriate, or areas where parking is not allowed.

11. The method according to claim 1, wherein, displaying virtual 3D display information corresponding to the driving assistance information comprises:
highlighting virtual 3D display information corresponding to rut information.

12. The method according to claim 9, wherein, displaying virtual 3D display information corresponding to the acquired traffic signs within the road area that the current vehicle has passed by comprises:
adjusting, according to a current position of the current vehicle and the virtual 3D display information corresponding to the traffic signs within the road area that the current vehicle has passed by, virtual 3D display information corresponding to the traffic signs within the road area that the current vehicle has passed by, and displaying the adjusted virtual 3D display information corresponding to the traffic signs.

13. The method according to claim 1, wherein, displaying virtual 3D display information corresponding to the driving assistance information comprises:
determining a display mode corresponding to the virtual 3D display information; and
displaying, based on the determined display mode, the virtual 3D display information corresponding to the driving assistance information,
wherein the display mode comprises at least one of:
a display position of virtual 3D display information,
a display pose of virtual 3D display information,
a display size of virtual 3D display information,
a display starting time of virtual 3D display information,
a display ending time of virtual 3D display information,
a display duration of virtual 3D display information,
a display detailedness of contents of virtual 3D display information,
a presentation mode for virtual 3D display information, or
a display relationship between multiple pieces of virtual 3D display information, and
wherein the presentation mode comprises at least one of the following: words, icons, animations, sound, light, or vibration.

14. The method according to claim 1, further comprising at least one of:
in response to there being multiple pieces of virtual 3D display information to be displayed, merging the multiple pieces of virtual 3D display information to be displayed, and displaying the merged virtual 3D display information; or
in response to the multiple pieces of virtual 3D display information to be displayed being displayed simultaneously, semantically integrating the multiple pieces of virtual 3D display information to be displayed, and displaying the semantically integrated virtual 3D display information.

15. The method according to claim 1, further comprising at least one of:
displaying, at a salient position within a current field of view of a driver, virtual 3D display information corresponding to driving assistance information having a priority higher than a first preset priority, and adjusting a position for displaying the virtual 3D display information in real time according to a position of sight of the driver; or
displaying virtual 3D display information corresponding to driving assistance information having a priority higher than the first preset priority, and pausing or stopping displaying virtual 3D display information corresponding to driving assistance information having a priority lower than a second preset priority.

16. The method according to claim 1, wherein, displaying virtual 3D display information corresponding to the driving assistance information comprises:
according to at least one of a current state of a vehicle, current road condition information, or a system latency condition of an apparatus, determining at least one of a display starting time, a display ending time, or a display duration of the virtual 3D display information; and
displaying, according to at least one of the determined display starting time, display ending time, or display duration of the virtual 3D display information, virtual 3D display information corresponding to the driving assistance information.

17. The method according to claim 1, wherein,
in response to there being multiple pieces of virtual 3D display information to be displayed corresponding to the driving assistance information and there is an occlusion relationship between the multiple pieces of virtual 3D display information to be displayed, the method further comprises at least one of:
displaying only a non-occluded portion of the virtual 3D display information, according to a positional relationship between the multiple pieces of virtual 3D display information having the occlusion relationship therebetween;
at different display times, displaying virtual 3D display information among the multiple pieces of virtual 3D display information having the occlusion relationship therebetween, respectively; or
adjusting at least one of a display position, a detailedness of contents, or a presentation mode for at least one of the multiple pieces of virtual 3D display information having the occlusion relationship therebetween, and displaying, according to the adjusted presentation mode, each of the multiple pieces of virtual 3D display information having the occlusion relationship therebetween.

18. The method according to claim 1,
wherein, displaying virtual 3D display information corresponding to the driving assistance information comprises:
at a preset display position, displaying virtual 3D display information to be displayed corresponding to the driving assistance information, and
wherein the preset display position comprises at least one of:
a display position aligned with real driving assistance information, an area position where driving of a driver will not be interfered, a salient position within a current field of view of the driver, a position where the field of view of the driver is relatively open, or a position to which insufficient attention is paid by the driver.

19. The method according to claim 1, further comprising:

rendering in advance virtual 3D display information to be displayed;

in response to a preset display trigger condition being fulfilled, acquiring, from the virtual 3D display information rendered in advance, virtual 3D display information to be displayed, adjusting, according to a current environment, a presentation mode for the virtual 3D display information, and displaying, according to the adjusted presentation mode, the virtual 3D display information; and adjusting, according to the current environment, a display mode for the virtual 3D display information in real time, and displaying, according to the adjusted display mode, the virtual 3D display information.

20. An Augmented Reality (AR) apparatus for driving assistance, the apparatus comprising:

a processor configured to determine, based on information acquired during a driving process, driving assistance information; and a display configured to:

display virtual three-dimensional (3D) display information corresponding to the driving assistance information determined by the processor, and in response to detecting abnormal rut information, display virtual 3D display information corresponding to an abnormal rut area having the abnormal rut information, wherein for displaying the virtual 3D display information corresponding to the driving assistance information, the display is configured to, in response to display latency of the virtual 3D display information exceeding an acceptable display latency for a corresponding speed of the driving process, change at least a part of the displayed virtual 3D display information corresponding to the driving assistance information into a stripe pattern.

* * * * *